US011948338B1

(12) United States Patent
Mammou et al.

(10) Patent No.: US 11,948,338 B1
(45) Date of Patent: Apr. 2, 2024

(54) 3D VOLUMETRIC CONTENT ENCODING USING 2D VIDEOS AND SIMPLIFIED 3D MESHES

(71) Applicant: Apple Inc., Cupertino, CA (US)

(72) Inventors: Khaled Mammou, Vancouver (CA); Fabrice A. Robinet, Sunnyvale, CA (US); Maneli Noorkami, Sunnyvale, CA (US); Afshin Taghavi Nasrabadi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/691,754

(22) Filed: Mar. 10, 2022

Related U.S. Application Data

(60) Provisional application No. 63/167,519, filed on Mar. 29, 2021.

(51) Int. Cl.
*G06T 9/00* (2006.01)
*G06T 3/40* (2006.01)
(Continued)

(52) U.S. Cl.
CPC ............ *G06T 9/001* (2013.01); *G06T 3/4023* (2013.01); *G06T 15/10* (2013.01); *G06T 17/205* (2013.01);
(Continued)

(58) Field of Classification Search
CPC ....... G06T 9/001; G06T 3/4023; G06T 15/10; G06T 17/205; G06T 2200/04; G06T 2200/08; G06T 2210/08
See application file for complete search history.

(56) References Cited

U.S. PATENT DOCUMENTS

| 5,793,371 A | 8/1998 | Deering |
| 5,842,004 A | 11/1998 | Deering |

(Continued)

FOREIGN PATENT DOCUMENTS

| CA | 309618 | 10/2019 |
| CN | 101198945 | 6/2008 |

(Continued)

OTHER PUBLICATIONS

U.S. Appl. No. 18/063,592, filed Dec. 8, 2022, Khaled Mammou, et al.

(Continued)

*Primary Examiner* — Phuc N Doan
(74) *Attorney, Agent, or Firm* — Alexander A. Knapp; Kowert, Hood, Munyon, Rankin & Goetzel, P.C.

(57) ABSTRACT

An encoder encodes three-dimensional (3D) volumetric content, such as immersive media, using video encoded attribute patch images packed into a 2D atlas to communicate the attribute values for the 3D volumetric content. The encoder also uses mesh-encoded sub-meshes to communicate geometry information for portions of the 3D object or scene corresponding to the attribute patch images packed into the 2D atlas. The encoder applies decimation operations to the sub-meshes to simplify the sub-meshes before mesh encoding the sub-meshes. A distortion analysis is performed to bound the level to which the sub-meshes are simplified at the encoder. Mesh simplification at the encoder reduces the number of vertices and edges included in the sub-meshes which simplifies rendering at a decoder receiving the encoded 3D volumetric content.

20 Claims, 17 Drawing Sheets

Atlas comprising packed attribute patch images for main views and non-redundant pixels of remaining views Atlas comprising packed depth patch images for main views and non-redundant pixels of remaining views

(51) Int. Cl.
  *G06T 3/4023* (2024.01)
  *G06T 15/10* (2011.01)
  *G06T 17/20* (2006.01)
(52) U.S. Cl.
  CPC ...... *G06T 2200/04* (2013.01); *G06T 2200/08* (2013.01); *G06T 2210/08* (2013.01)

(56) References Cited

U.S. PATENT DOCUMENTS

| | | |
|---|---|---|
| 5,867,167 A | 2/1999 | Deering |
| 5,870,094 A | 2/1999 | Deering |
| 5,905,502 A | 5/1999 | Deering |
| 5,933,153 A | 8/1999 | Deering |
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,476,803 B1 | 11/2002 | Zhang |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 8,055,070 B2 | 11/2011 | Bassi et al. |
| 8,264,549 B2 | 9/2012 | Tokiwa et al. |
| 8,315,425 B2 | 11/2012 | Appel |
| 8,411,932 B2 | 4/2013 | Liu et al. |
| 8,520,740 B2 | 8/2013 | Flachs |
| 8,566,736 B1 | 10/2013 | Jacob |
| 8,643,515 B2 | 2/2014 | Cideciyan |
| 8,718,405 B2 | 5/2014 | Fujiki |
| 8,780,112 B2 | 7/2014 | Kontkanen et al. |
| 8,805,097 B2 | 8/2014 | Ahn et al. |
| 8,884,953 B2 | 11/2014 | Chen et al. |
| 8,996,228 B1 | 3/2015 | Ferguson |
| 9,064,311 B2 | 6/2015 | Mammou et al. |
| 9,064,331 B2 | 6/2015 | Yamashita |
| 9,117,105 B2 | 8/2015 | Da |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,108,867 B1 | 10/2018 | Vallespi-Gonzalez |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Arlinsky et al. |
| 10,510,148 B2 | 12/2019 | Qui |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou et al. |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote Krishnaprasad |
| 11,363,309 B2 | 6/2022 | Tourapis et al. |
| 11,386,524 B2 | 7/2022 | Mammou et al. |
| 11,398,058 B2 | 7/2022 | Zakharchenko |
| 11,398,833 B2 | 7/2022 | Flynn et al. |
| 11,409,998 B2 | 8/2022 | Mammou et al. |
| 11,450,030 B2 | 9/2022 | Mammou |
| 11,450,031 B2 | 9/2022 | Flynn |
| 11,461,935 B2 | 10/2022 | Mammou et al. |
| 11,475,605 B2 | 10/2022 | Flynn |
| 11,494,947 B2 | 11/2022 | Mammou et al. |
| 11,503,367 B2 | 11/2022 | Yea |
| 11,508,095 B2 | 11/2022 | Mammou et al. |
| 11,527,018 B2 | 12/2022 | Mammou et al. |
| 11,552,651 B2 | 1/2023 | Mammou et al. |
| 11,615,557 B2 | 3/2023 | Flynn |
| 11,620,768 B2 | 4/2023 | Flynn |
| 11,711,544 B2 | 7/2023 | Tourapis et al. |

(56) References Cited

U.S. PATENT DOCUMENTS

| | | |
|---|---|---|
| 11,727,603 B2 | 8/2023 | Mammou et al. |
| 2002/0181741 A1 | 12/2002 | Masukura |
| 2003/0066949 A1 | 4/2003 | Mueller |
| 2004/0217956 A1 | 11/2004 | Besl et al. |
| 2006/0133508 A1 | 6/2006 | Sekiguchi |
| 2007/0025624 A1* | 2/2007 | Baumberg ............ G06T 15/205 |
| | | 382/154 |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2008/0225116 A1 | 9/2008 | Kang |
| 2009/0016598 A1 | 1/2009 | Lojewski |
| 2009/0027412 A1 | 1/2009 | Burley |
| 2009/0087111 A1 | 4/2009 | Noda et al. |
| 2009/0213143 A1* | 8/2009 | Igarashi ................ G06T 3/0093 |
| | | 345/643 |
| 2009/0243921 A1 | 10/2009 | Gebben et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0156101 A1 | 6/2013 | Lu |
| 2013/0195352 A1 | 8/2013 | Nystad |
| 2013/0202197 A1 | 8/2013 | Reeler |
| 2013/0321418 A1 | 12/2013 | Kirk |
| 2013/0322738 A1 | 12/2013 | Oh |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0176672 A1 | 6/2014 | Lu |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2014/0334717 A1 | 11/2014 | Jiang |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Boch |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0247120 A1 | 8/2017 | Miller |
| 2017/0249401 A1 | 8/2017 | Eckart et al. |
| 2017/0323617 A1 | 11/2017 | Yang |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0018786 A1 | 1/2018 | Jakubiak |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0192061 A1 | 7/2018 | He |
| 2018/0253867 A1 | 9/2018 | Laroche |
| 2018/0260416 A1 | 9/2018 | Elkaim |
| 2018/0268570 A1 | 9/2018 | Budagavi |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0045157 A1 | 2/2019 | Venshtain |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1 | 5/2020 | Budagavi |
| 2020/0153885 A1 | 5/2020 | Lee et al. |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |

(56) References Cited

U.S. PATENT DOCUMENTS

| | | |
|---|---|---|
| 2020/0228836 A1 | 7/2020 | Schwarz et al. |
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0294271 A1 | 9/2020 | Ilola |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2020/0396489 A1 | 12/2020 | Flynn |
| 2020/0413096 A1 | 12/2020 | Zhang |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0056732 A1 | 2/2021 | Han |
| 2021/0074029 A1 | 3/2021 | Fleureau |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis et al. |
| 2021/0103780 A1 | 4/2021 | Mammou et al. |
| 2021/0104014 A1 | 4/2021 | Kolb, V |
| 2021/0104073 A1 | 4/2021 | Yea et al. |
| 2021/0104075 A1 | 4/2021 | Mammou et al. |
| 2021/0105022 A1 | 4/2021 | Flynn et al. |
| 2021/0105493 A1 | 4/2021 | Mammou et al. |
| 2021/0105504 A1 | 4/2021 | Hur et al. |
| 2021/0112281 A1 | 4/2021 | Wang |
| 2021/0118190 A1 | 4/2021 | Mammou et al. |
| 2021/0119640 A1 | 4/2021 | Mammou et al. |
| 2021/0142522 A1 | 5/2021 | Li |
| 2021/0150765 A1 | 5/2021 | Mammou et al. |
| 2021/0150766 A1 | 5/2021 | Mammou et al. |
| 2021/0150771 A1 | 5/2021 | Huang |
| 2021/0166432 A1 | 6/2021 | Wang |
| 2021/0166436 A1 | 6/2021 | Zhang |
| 2021/0168386 A1 | 6/2021 | Zhang |
| 2021/0183112 A1 | 6/2021 | Mammou et al. |
| 2021/0185331 A1 | 6/2021 | Mammou et al. |
| 2021/0195162 A1 | 6/2021 | Chupeau et al. |
| 2021/0201541 A1 | 7/2021 | Lasserre |
| 2021/0203989 A1 | 7/2021 | Wang |
| 2021/0211724 A1 | 7/2021 | Kim et al. |
| 2021/0217139 A1 | 7/2021 | Yano |
| 2021/0217203 A1 | 7/2021 | Kim et al. |
| 2021/0217206 A1 | 7/2021 | Flynn |
| 2021/0218969 A1 | 7/2021 | Lasserre |
| 2021/0218994 A1 | 7/2021 | Flynn |
| 2021/0233281 A1 | 7/2021 | Wang et al. |
| 2021/0248784 A1 | 8/2021 | Gao |
| 2021/0248785 A1 | 8/2021 | Zhang |
| 2021/0256735 A1 | 8/2021 | Tourapis et al. |
| 2021/0258610 A1 | 8/2021 | Iguchi |
| 2021/0264640 A1 | 8/2021 | Mammou et al. |
| 2021/0264641 A1 | 8/2021 | Iguchi |
| 2021/0266597 A1 | 8/2021 | Kim et al. |
| 2021/0281874 A1 | 9/2021 | Lasserre |
| 2021/0295569 A1 | 9/2021 | Sugio |
| 2021/0319593 A1 | 10/2021 | Flynn |
| 2021/0383576 A1 | 12/2021 | Olivier |
| 2021/0398352 A1 | 12/2021 | Tokumo |
| 2021/0400280 A1 | 12/2021 | Zaghetto |
| 2021/0407147 A1 | 12/2021 | Flynn |
| 2021/0407148 A1 | 12/2021 | Flynn |
| 2022/0020211 A1 | 1/2022 | Vytyaz |
| 2022/0030258 A1 | 1/2022 | Zhang |
| 2022/0084164 A1 | 3/2022 | Hur |
| 2022/0101555 A1 | 3/2022 | Zhang |
| 2022/0116659 A1 | 4/2022 | Pesonen |
| 2022/0164994 A1 | 5/2022 | Joshi |
| 2022/0239956 A1 | 7/2022 | Tourapis |
| 2022/0383448 A1* | 12/2022 | Valdez Balderas ... G06T 3/4046 |
| 2022/0405533 A1 | 12/2022 | Mammou et al. |
| 2023/0169658 A1 | 6/2023 | Rhodes |

FOREIGN PATENT DOCUMENTS

| | | |
|---|---|---|
| CN | 10230618 | 1/2012 |
| CN | 102428698 | 4/2012 |
| CN | 102630011 | 8/2012 |
| CN | 103329524 | 9/2013 |
| CN | 103366006 | 10/2013 |
| CN | 103944580 | 7/2014 |
| CN | 104156972 | 11/2014 |
| CN | 104408689 | 3/2015 |
| CN | 105261060 | 1/2016 |
| CN | 105818167 | 8/2016 |
| CN | 106651942 | 5/2017 |
| CN | 106846425 | 6/2017 |
| CN | 107155342 | 9/2017 |
| CN | 108632607 | 10/2018 |
| EP | 1745442 | 1/2007 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| JP | 2013111948 | 6/2013 |
| WO | 200004506 A1 | 1/2000 |
| WO | 2008129021 | 10/2008 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Liu Chao, "Research on point cloud data processing and reconstruction," Full-text Database, Feb. 7, 2023.

U.S. Appl. No. 18/189,099, filed Mar. 23, 2023, Kjungsun Kim, et al.

U.S. Appl. No. 17/157,833, filed Jan. 25, 2021, Khaled Mammou.

U.S. Appl. No. 18/052,803, filed Nov. 4, 2022, Mammou, et al.

Pragyana K. Mishra, "Image and Depth Coherent Surface Description", Doctoral dissertation, Carnegie Mellon University, The Robotics Institute, Mar. 2005, pp. 1-152.

Robert Cohen, "CE 3.2 point-based prediction for point loud compression", dated Apr. 2018, pp. 1-6.

Jang et al., Video-Based Point-Cloud-Compression Standard in MPEG: From Evidence Collection to Committee Draft [Standards in a Nutshell], IEEE Signal Processing Magazine, Apr. 2019.

(56) References Cited

OTHER PUBLICATIONS

Ekekrantz, Johan, et al., "Adaptive Cost Function for Pointcloud Registration," arXiv preprint arXiv: 1704.07910 (2017), pp. 1-10.
Vincente Morell, et al., "Geometric 3D point cloud compression", Copyright 2014 Elsevier B.V. All rights reserved, pp. 1-18.
U.S. Appl. No. 17/523,826, filed Nov. 10, 2021, Mammou, et a.
Chou, et al., "Dynamic Polygon Clouds: Representation and Compression for VR/AR", ARXIV ID: 1610.00402, Published Oct. 3, 2016, pp. 1-28.
U.S. Appl. No. 17/804,477, filed May 27, 2022, Khaled Mammou, et al.
Jingming Dong, "Optimal Visual Representation Engineering and Learning for Computer Vision", Doctoral Dissertation, UCLA, 2017, pp. 1-151.
Khaled Mammou et al., "Working Draft of Point Cloud Coding for Category 2 (Draft 1)", dated Apr. 2018, pp. 1-38.
Khaled Mammou et al., "Input Contribution", dated Oct. 8, 2018, pp. 1-42.
Benjamin Bross et al., "High Effeciency Video Coding (HEVC) Text Specification Draft 8", dated Jul. 23, 2012, pp. 1-86.
JunTaek Park et al., "Non-Overlapping Patch Packing in TMC2 with HEVC-SCC", dated Oct. 8, 2018, pp. 1-6.
Ismael Daribo, et al., "Efficient Rate-Distortion Compression on Dynamic Point Cloud for Grid-Pattern-Based 3D Scanning Systems", 3D Research 3.1, Springer, 2012, pp. 1-9.
Cohen Robert A et al, "Point Cloud Attribute Compression Using 3-D Intra Prediction and Shape-Adaptive Transforms", dated Mar. 30, 2016, pp. 141-150.
Sebastian Schwarz, et al., "Emerging MPEG Standards for Point Cloud Compression", IEEE Journal on Emerging and Selected Topics in Circuits and Systems, vol. 9, No. 1, Mar. 2019, pp. 133-148.
Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
Bin Lu, et al., ""Massive Point Cloud Space Management Method Based on Octree-Like Encoding"", Arabian Journal forScience Engineering, https://doi.org/10.1007/s13369-019-03968-7, 2019, pp. 1-15.
Wikipedia, ""k-d tree"", Aug. 1, 2019, Retrieved from URL: https://en.wikipedia.org/w.indec.php?title=Kd_tree&oldid=908900837, pp. 1-9.
"David Flynn et al., ""G-PCC: A hierarchical geometry slice structure""", MPEG Meeting, Retrieved from http://phenix.intevry.fr/mpeg/doc_end_user/documents/131_Online/wg11/m54677-v1-m54677_vl.zip, Jun. 28, 2020, pp. 1-9".
""G-PCC Future Enchancements"", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30.
Miska M. Hannuksela, "On Slices and Tiles", JVET Meeting, The Joint Video Exploration Team of ISO/IEC, Sep. 25, 2018, pp. 1-3.

David Flynn, "International Organisation for Standardisation Organisation International De Normalisation ISO/IEC JTC1/SC29/WG11 Coding of Moving Pictures and Audio", dated Apr. 2020. pp. 1-9.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
Tim Golla et al., "Real-time Point Cloud Compression", IROS, 2015, pp. 1-6.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Tilo Ochotta et al., "Image-Based Surface Compression", dated Sep. 1, 2008, pp. 1647-1663.
W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.2017.8122226 (Year 2017).
U.S. Appl. No. 17/718,647, filed Apr. 12, 2022, Alexandros Tourapis, et al.
Stefan Gumhold et al, "Predictive Point-Cloud Compression", dated Jul. 31, 2005, pp. 1-7.
Pierre-Marie Gandoin et al, "Progressive Lossless Compression of Arbitrary Simplicial Complexes", dated Jul. 1, 2002, pp. 1-8.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
Merry et al., Compression of dense and regular point clouds, Proceedings of the 4th international conference on Computer graphics, virtual reality, visualisation and interaction in Africa (pp. 15-20). ACM. (Jan. 2006).
Lustosa et al., Database system support of simulation data, Proceedings of the VLDB Endowment 9.13 (2016): pp. 1329-1340.
Hao Liu, et al., "A Comprehensive Study and Comparison of Core Technologies for MPEG 3D Point Cloud Compression", arXiv:1912.09674v1, Dec. 20, 2019, pp. 1-17.
Styliani Psomadaki, "Using a Space Filing Curve for The Management of Dynamic Point Cloud Data in a Relational DBMS", Nov. 2016, pp. 1-158.
Remi Cura et al., "Implicit Lod for Processing and Classification in Point Cloud Servers", dated Mar. 4, 2016, pp. 1-18.
Yan Huang et al., Octree-Based Progressive Geometry Coding of Point Clouds, dated Jan. 1, 2006, pp. 1-10.
Khaled Mammou, et al., "G-PCC codec description v1", International Organisation for Standardisation, ISO/IEC JTC1/SC29/WG11, Oct. 2018, pp. 1-32.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG), dated Sep. 6, 2019.
Jianqiang Liu et al, "Data-Adaptive Packing Method for Compresssion of Dynamic Point Cloud Sequences", dated Jul. 3, 2019, pp. 904-909.
Jorn Jachalsky et al., "D4.2.1 Scene Analysis with Spatio-Temporal", dated Apr. 30, 2013, pp. 1-60.
Lasserre S et al, "Global Motion Compensation for Point Cloud Compression in TMC3", dated Oct. 3, 2018, pp. 1-28.

(56) References Cited

OTHER PUBLICATIONS

D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.

"Continuous improvement of study text of ISO-IEC CD 23090-5 Video-Based Point Cloud Compression" dated May 8, 2019, pp. 1-140.

Mehlem D. et al, "Smoothing considerations for V-PCC", dated Oct. 2, 2019, pp. 1-8.

Flynn D et al, "G-PCC Bypass coding of bypass bins", dated Mar. 21, 2019, pp. 1-3.

Sharman K et al, "CABAC Packet-Based Stream", dated Nov. 18, 2011, pp. 1-6.

Lasserre S et al, "On bypassed bit coding and chunks", dated Apr. 6, 2020, pp. 1-3.

David Flynn et al., "G-pcc low latency bypass bin coding". dated Oct. 3, 2019, pp. 1-4.

Chuan Wang, et al., "Video Vectorization via Tetrahedral Remeshing", IEEE Transactions on Image Processing, vol. 26, No. 4, Apr. 2017, pp. 1833-1844.

Keming Cao, et al., "Visual Quality of Compressed Mesh and Point Cloud Sequences", IEEE Access, vol. 8, 2020. pp. 171203-171217.

\* cited by examiner

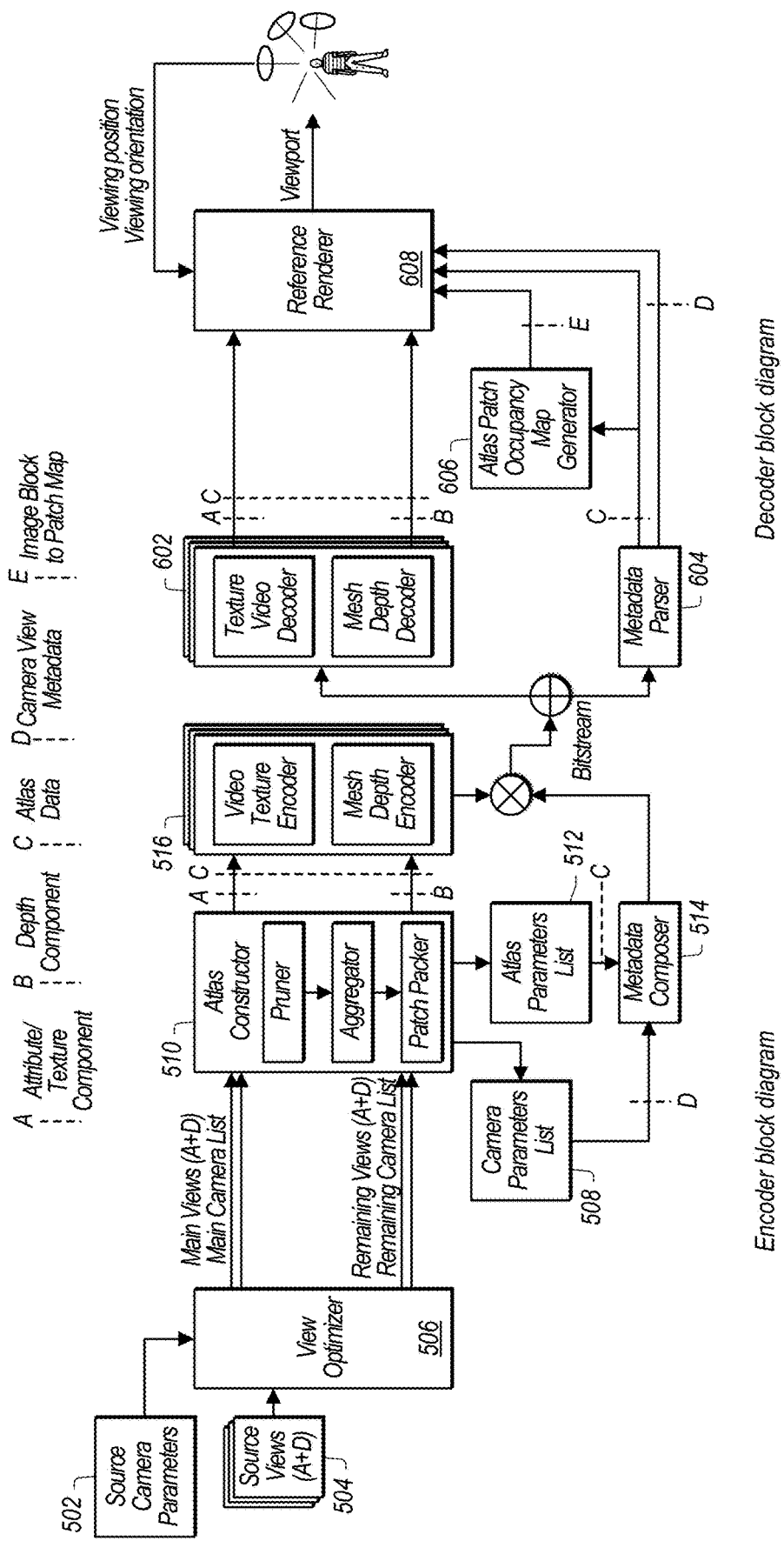

*Example Mesh Decimation Operations that may be Applied to a Mesh-Based Representation of a Depth Patch*

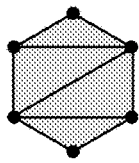

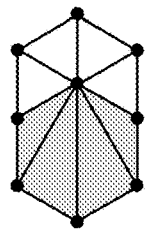

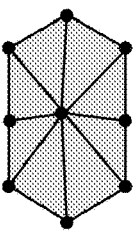

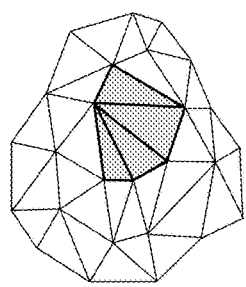

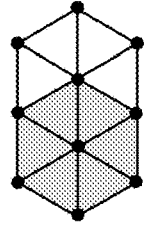

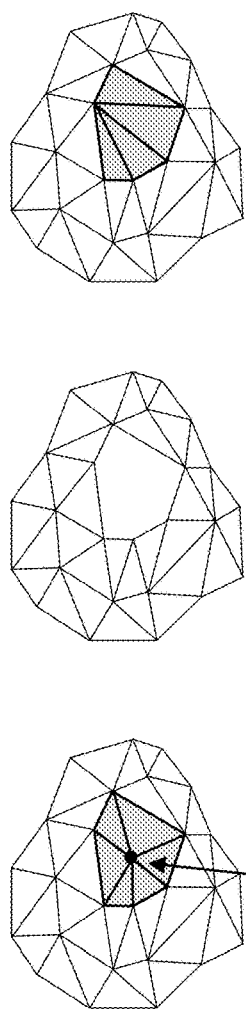

Vertex Removal

FIG. 9

Partial-Edge Collapse

FIG. 10A

Full-Edge Collapse

FIG. 10B

Select all triangles sharing this vertex

Remove the selected triangles, creating the hole

Fill the hole with new triangles

Select an edge to collapse

Remove edge causing vertices connected by the edge to be combined into a common vertex

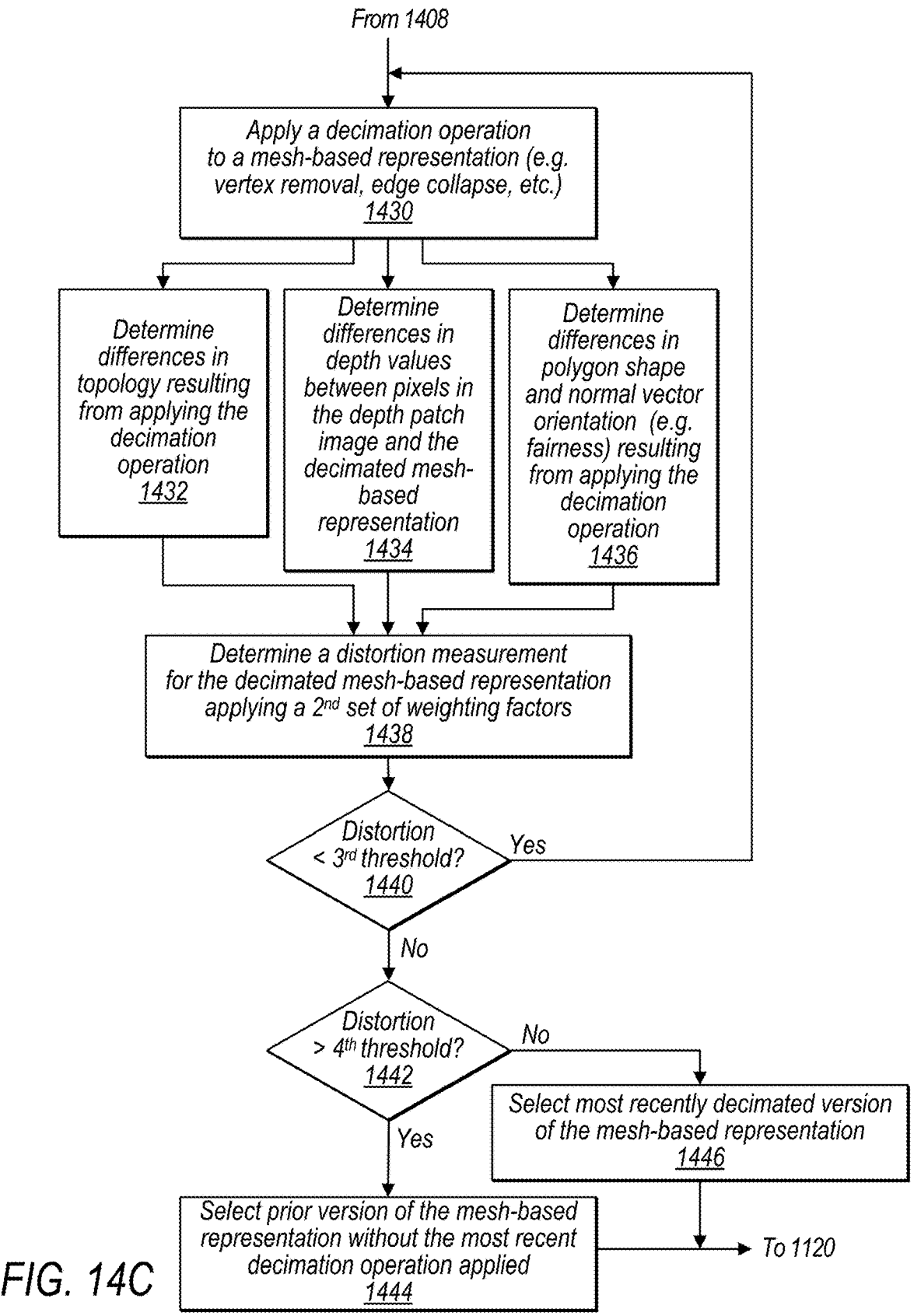

3D VOLUMETRIC CONTENT ENCODING USING 2D VIDEOS AND SIMPLIFIED 3D MESHES

RELATED APPLICATION

This application claims benefit of priority to U.S. Provisional Application Ser. No. 63/167,519, entitled "3D Volumetric Content Encoding Using 2D Videos and Simplified 3D Meshes," filed Mar. 29, 2021, and which is incorporated herein by reference in its entirety.

BACKGROUND

Technical Field

This disclosure relates generally to compression and decompression of three-dimensional (3D) volumetric content, more particularly volumetric content coding using videos and simplified meshes.

DESCRIPTION OF THE RELATED ART

Three-dimensional (3D) volumetric content may be generated using images captured by multiple cameras positioned at different camera angles and/or locations relative to an object or scene to be captured. The 3D volumetric content includes attribute information for the object or scene, such as color information (e.g. RGB values), texture information, intensity attributes, reflectivity attributes, or various other attributes. In some circumstances, additional attributes may be assigned, such as a time-stamp when the 3D volumetric content was captured. The 3D volumetric content also includes geometry information for the object or scene, such as depth values for surfaces of the object or depth values for items in the scene. Such 3D volumetric content may make up "immersive media" content, which in some cases may comprise a set of views each having associated spatial information (e.g. depth) and associated attributes. In some circumstances, 3D volumetric content may be generated, for example in software, as opposed to being captured by one or more cameras/sensors. In either case, such 3D volumetric content may include large amounts of data and may be costly and time-consuming to store and transmit.

SUMMARY OF EMBODIMENTS

In some embodiments, attribute information, such as colors, textures, etc. for three-dimensional (3D) volumetric content are encoded using views of the 3D volumetric content that are packed into a 2D atlas. At least some redundant information that is shown in multiple ones of the views is removed, such that the redundant information is not repeated in multiple views included in the atlas. Geometry information for the 3D volumetric content is also generated for the views included in the atlas. For example a depth map corresponding to the views (with the redundant information omitted) may be generated. However, instead of encoding the depth map using 2D video image frames, mesh-based representations corresponding to portions of the depth map (e.g. depth patch images) are generated and encoded using a mesh-based encoder. Also, the generated mesh-based representations may be simplified by removing edges or vertices from the meshes prior to mesh encoding the simplified mesh-based representations. In some embodiments, a distortion analysis is performed that compares simplified meshes to the corresponding portions of the depth map (e.g. depth patch images) to determine a degree to which the meshes may be simplified such that the simplified meshes vary from the geometries represented by the respective portions of the depth map (e.g. depth patch images) by less than one or more threshold amounts for one or more respective distortion criteria. In some embodiments, the encoding and compression of such 3D volumetric content, as described herein, may be performed at a server or other computing device of an entity that creates or provides the encoded/compressed 3D volumetric content. The encoded/compressed 3D volumetric content may be provided to a decoding device for use in reconstructing the 3D volumetric content, at the decoding device. For example, the decoding device may render the 3D volumetric content on a display associated with the decoding device.

In some embodiments, an encoder for encoding 3D volumetric content is implemented via program instructions, that when executed on or across one or more processors (such as of an encoding device), cause the one or more processors to receive images of a three-dimensional (3D) object or scene, wherein the images are captured from a plurality of camera viewing angles or locations for viewing the 3D object or scene. For example, the received images may have been captured by a device comprising cameras for capturing immersive media content and may have been provided to an encoder of the device. The program instructions further cause the one or more processors to generate, based on the received images, an atlas comprising attribute patches for the 3D object or scene and generate, based on the received images, mesh-based representations for respective depth patches corresponding to the attribute patches of the atlas. In some embodiments, the atlas may include a main view of the object or scene and one or more additional views that do not include information already included in the main view or other ones of the views. For example, redundant information may be omitted from subsequent views. The different views (with redundant information omitted) may form patches, wherein each patch has a corresponding attribute patch image and a corresponding geometry patch image. A given attribute patch image comprises attribute values for a portion of the object or scene represented by a given patch that corresponds with a given one of the views included in the atlas. Also, a given geometry patch image comprises geometry information, such as depth values, for the given patch, wherein the depth values represent depth values for the same portion of the object or scene as is represented by the corresponding attribute patch image for the given patch.

For respective ones of the mesh-based representations, the program instructions, when executed on or across the one or more processors, further cause the one or more processors to remove one or more vertices or edges of the respective mesh-based representations to generate a simplified versions of the respective mesh-based representations. The program instructions, also cause the one or more processors to perform a distortion analysis for the respective simplified versions of the mesh-based representations. If an amount of distortion caused by removing the one or more vertices or edges is less than a threshold amount, a simplified version of the mesh-based representation is selected and if the amount of distortion caused by removing the one or more vertices or edges is equal to or greater than the threshold amount, the mesh-based representation that has not had at least some of the one or more edges or vertices removed is selected.

In some embodiments, the removal of edges or vertices and the distortion analysis may be iteratively performed until the distortion threshold is reached. Also, in some embodiments, distortion analysis may further be used to select a manner in which the vertices or edges are removed. More generally speaking, removal of an edge or vertex may be an example of a decimation operation. In some embodiments, distortion analysis is used to determine how a decimation operation is to be performed and how many decimation operations are to be performed to simplify the mesh-based representations, wherein the decimation operations are selected taking into account distortion caused by performing the decimation operations.

Once simplified versions of the mesh-based representation are selected based on the distortion analysis, the program instructions cause the one or more processors to provide the selected mesh-based representations that have been simplified based on the distortion analysis and provide the atlas comprising the corresponding attribute patch images. For example, the simplified mesh-based representations may be provided as encoded meshes and the atlas comprising the attribute patch images may be provided as a video image frame that has been video encoded.

In some embodiments, 3D volumetric content may be encoded as described above for the object or scene at a plurality of moments in time. In such embodiments, simplified mesh-based representations may be generated and selected for a group of frames, wherein respective ones of the frames of the group of frames correspond to respective ones of the plurality of moments in time. In such embodiments, different versions of a same mesh-based representation at different ones of the moments in time may be simplified in a same manner for each of the versions at the different ones of the moments in time such that the simplified mesh-based representation has a same connectivity in each of the versions included in the group of frames for the respective moments in time. While, different mesh-based representations corresponding to different portions of the object or scene for a same given moment in time may be simplified using different or differently applied decimation operations, same ones of the mesh-based representations having different versions in time across the group of frames are decimated in a same manner resulting in a same connectivity for the versions of the simplified mesh-based representation across the frames of the group of frames.

In some embodiments, the generation of the atlas comprising the attribute patch images and the generation and selection of the corresponding simplified mesh-based representations may be performed by an entity that provides 3D volumetric content, such as at a server. The mesh encoded simplified mesh-based representations and the atlas comprising corresponding attribute patch images encoded in a video encoding format may be provided to a receiving entity that renders the 3D volumetric content using the provided encoded meshes and video images. For example, a virtual reality display device, augmented reality display device, etc. may render a reconstructed version of the 3D volumetric content using the provided encoded meshes and encoded video image frames.

BRIEF DESCRIPTION OF THE DRAWINGS

FIG. 5 illustrates a block diagram for an encoder configured to encode three-dimensional (3D) volumetric content using video encoded attribute patch images and simplified mesh-based representations that are mesh encoded, according to some embodiments.

FIG. 6 illustrates a block diagram for a decoder configured to use video encoded attribute patch images and encoded mesh-based representations to generate a reconstructed version of encoded 3D volumetric content, according to some embodiments.

FIG. 9 illustrates an example method of performing a vertex removal mesh decimation operation, according to some embodiments.

FIG. 10A illustrates an example method of performing a partial-edge collapse mesh decimation operation, according to some embodiments.

FIG. 10B illustrates an example method of performing a full-edge collapse mesh decimation operation, according to some embodiments.

FIGS. 14A-14C illustrate a flow chart providing additional details on how decimation operations are selected and applied to simplify the mesh-based representations, according to some embodiments.

Figure 1A:
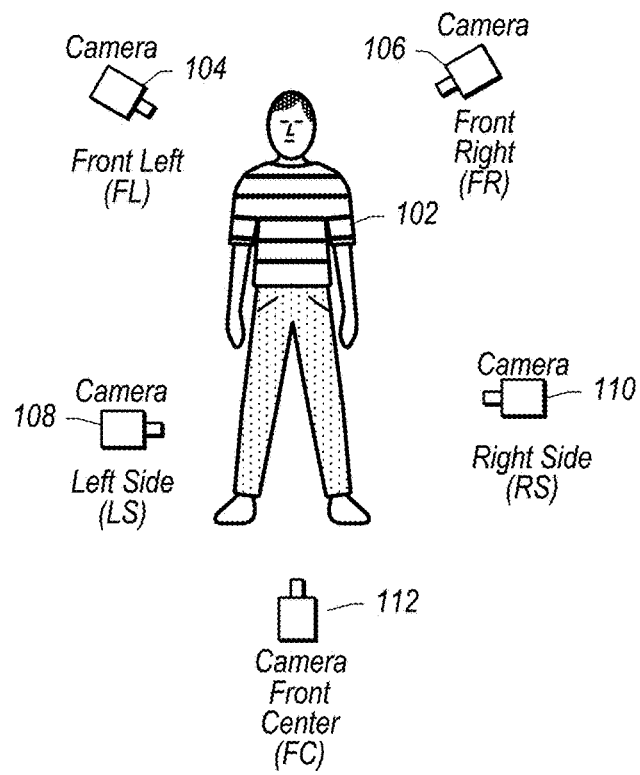
FIG. 1A illustrates a front view of a plurality of cameras located at different locations and/or camera angles relative to an object or scene, wherein the cameras capture images of the object or scene, and wherein the captured images are used to generate three-dimensional volumetric content representing the object or scene, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture three-dimensional (3D) volumetric content, such as immersive video content, etc. has increased. Also, the development of advanced display technologies, such as virtual reality or augmented reality systems, has increased potential uses for 3D volumetric content, such as immersive video, etc. However, 3D volumetric content files are often very large and may be costly and time-consuming to store and transmit. For example, communication of 3D volumetric content, such as volumetric point cloud or immersive video content, over private or public networks, such as the Internet, may require considerable amounts of time and/or network resources, such that some uses of 3D volumetric content, such as real-time uses or on-demand uses, may be limited. Also, storage requirements of 3D volumetric content files may consume a significant amount of storage capacity of devices storing such files, which may also limit potential applications for using 3D volumetric content.

In some embodiments, an encoder may be used to generate a compressed version of three-dimensional volumetric content to reduce costs and time associated with storing and transmitting large 3D volumetric content files. In some embodiments, a system may include an encoder that compresses attribute and/or spatial information of a volumetric point cloud or immersive video content file such that the file may be stored and transmitted more quickly than non-compressed volumetric content and in a manner such that the compressed volumetric content file may occupy less storage space than non-compressed volumetric content. In some embodiments, such compression may enable 3D volumetric content to be communicated over a network in real-time or in near real-time, or on-demand in response to demand from a consumer of the 3D volumetric content.

In some embodiments, a system may include a decoder that receives encoded 3D volumetric content comprising video encoded attribute information and simplified mesh-based representations of geometry information that have been mesh-encoded via a network from a remote server or other storage device that stores or generates the volumetric content files. For example, a 3-D display, a holographic display, or a head-mounted display may be manipulated in real-time or near real-time to show different portions of a virtual world represented by 3D volumetric content. In order to update the 3-D display, the holographic display, or the head-mounted display, a system associated with the decoder may request data from the remote server based on user manipulations (or anticipated user manipulations) of the displays, and the data may be transmitted from the remote server to the decoder in a form of encoded 3D volumetric content (e.g. video encoded attribute patch images and mesh-encoded simplified mesh-based representations). The displays may then be updated with updated data responsive to the user manipulations, such as updated views.

In some embodiments, sensors may capture attribute information for one or more points, such as color attributes, texture attributes, reflectivity attributes, velocity attributes, acceleration attributes, time attributes, modalities, and/or various other attributes. For example, in some embodiments, an immersive video capture system, such as that may follow MPEG immersive video (MIV) standards, may use a plurality of cameras to capture images of a scene or object from a plurality of viewing angles and/or locations and may further use these captured images to determine spatial information for points or surfaces of the object or scene, wherein the spatial information and attribute information is encoded using video-encoded attribute image patches and mesh-encoded simplified mesh-base representations generated as described herein.

Generating 3D Volumetric Content

In some embodiments, 3D volumetric content that is to be encoded/compressed, as described herein, may be generated from a plurality of images of an object or scene representing multiple views of the object or scene, wherein additional metadata is known about the placement and orientation of the cameras that captured the multiple views.

For example, FIG. 1A illustrates an object (person 102) for which multiple images are being captured representing multiple views of the object, when viewed from cameras located at different locations and viewing angles relative to the object.

In FIG. 1A cameras 104, 106, 108, 110, and 112 view person 102 from different camera locations and/or viewing angles. For example, camera 112 captures a front center (FC) view of person 102, camera 108 captures a left side (LS) view of person 102, camera 110 captures a right side (RS) view of person 102, camera 104 captures a front left (FL) view of person 102, and camera 106 captures a front right (FR) view of person 102.

Figure 1B:
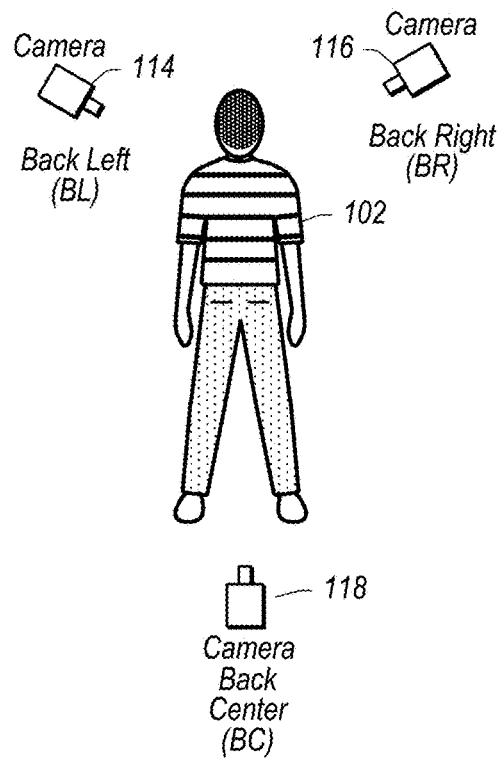
FIG. 1B illustrates a back view showing additional cameras located at different locations and/or camera angles relative to the object or scene, wherein the additional cameras capture images of the object or scene that are used to generate the three-dimensional volumetric content representing the object or scene, according to some embodiments.

FIG. 1B illustrates additional cameras that may be located behind person 102. For example, camera 118 captures a back center (BC) view of person 102, camera 114 captures a back left (BL) view of person 102, camera 116 captures a back right (BR) view of person 102, etc.

Figure 1C:
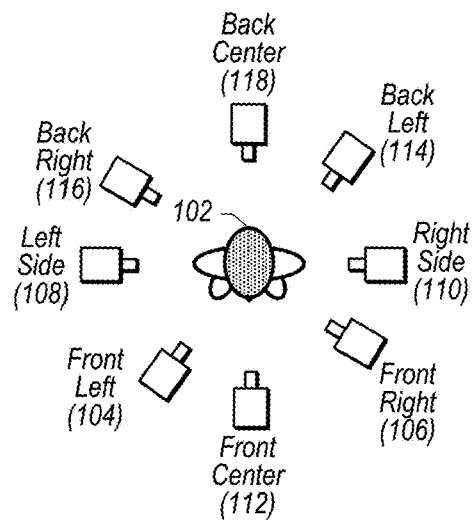
FIG. 1C illustrates a top view showing the cameras and the additional cameras located at the different locations and/or camera angles relative to the object or scene, wherein the cameras and the additional cameras capture the images of the object or scene that are used to generate the three-dimensional volumetric content representing the object or scene, according to some embodiments.

FIG. 1C is a top view illustrating the cameras shown in FIGS. 1A and 1B that are located at different locations and viewing angles relative to person 102. Note that the camera positions and camera angles shown in FIGS. 1A-IC are given as an example configuration and in some embodiments other camera configurations may be used. For example, in some embodiments, when capturing images for a scene, the cameras may face outward towards the scene as opposed to pointing inward towards an object, as shown in FIG. 1C. Also, in some embodiments, the cameras may not necessarily be arranged in a circular configuration, but may instead be arranged in other configurations, such as a square, rectangle, grid pattern, etc.

Figure 1D:
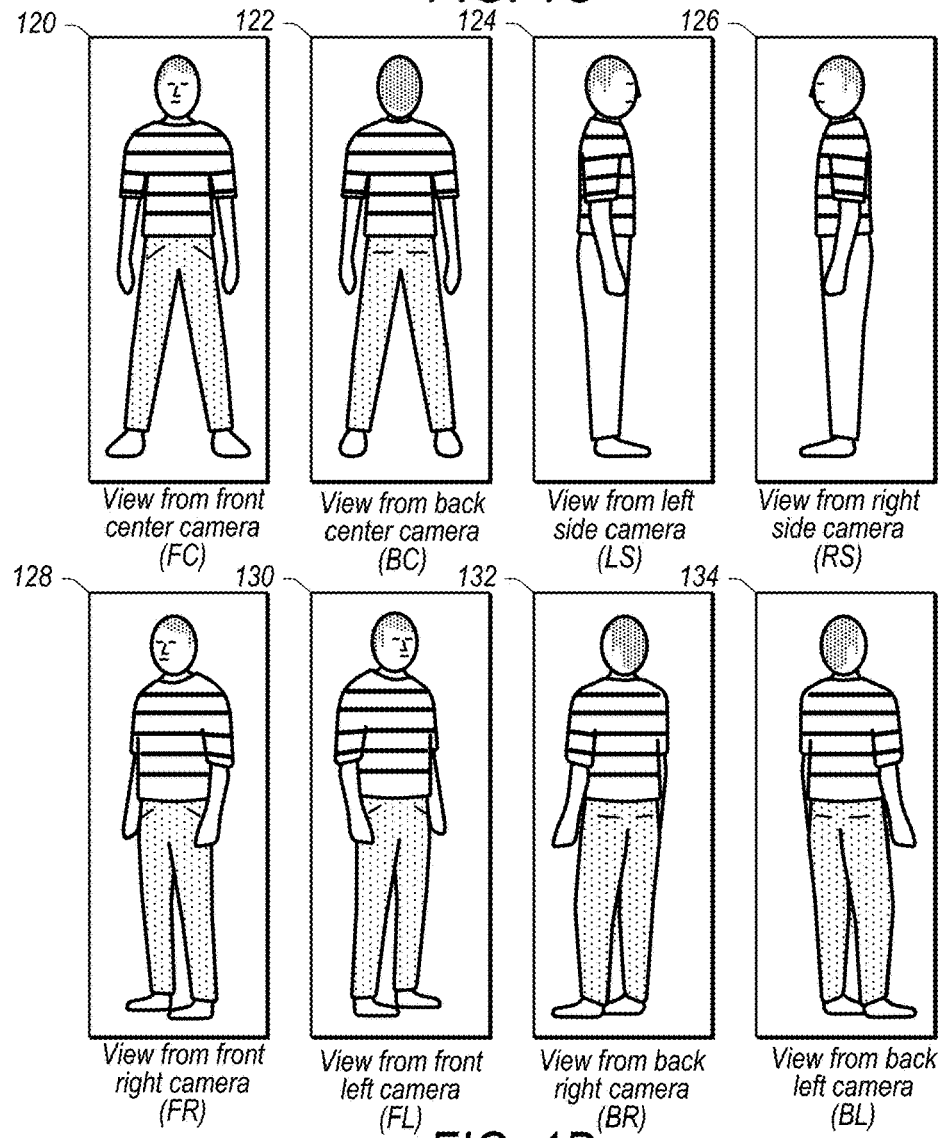
FIG. 1D illustrates respective views of the object or scene captured by the cameras and the additional cameras located at the different locations and/or camera angles relative to the object or scene, according to some embodiments.

FIG. 1D illustrates images that may have been captured via cameras 104-118 as shown in FIGS. 1C-1D. For example image 120 shows a front center (FC) view, image 122 shows a back center (BC) view, image 124 shows a left side (LS) view, image 126 shows a right side (RS) view, image 128 shows a front right (FR) view, image 130 shows a front left (FL) view, image 134 shows a back right (BR) view, and image 134 shows a back left (BL) view.

In some embodiments, metadata is associated with each of the views as shown in FIG. 1D, wherein the metadata (e.g. source camera parameters) indicate locations and camera angles for the respective cameras 104-118 that were used to capture images 120-134. In some embodiments, this metadata may be used to determine geometry information for the object or scene that is being captured by the respective cameras, such as X, Y, and Z coordinates of points of the object or scene (or other types of spatial information).

Figure 2:
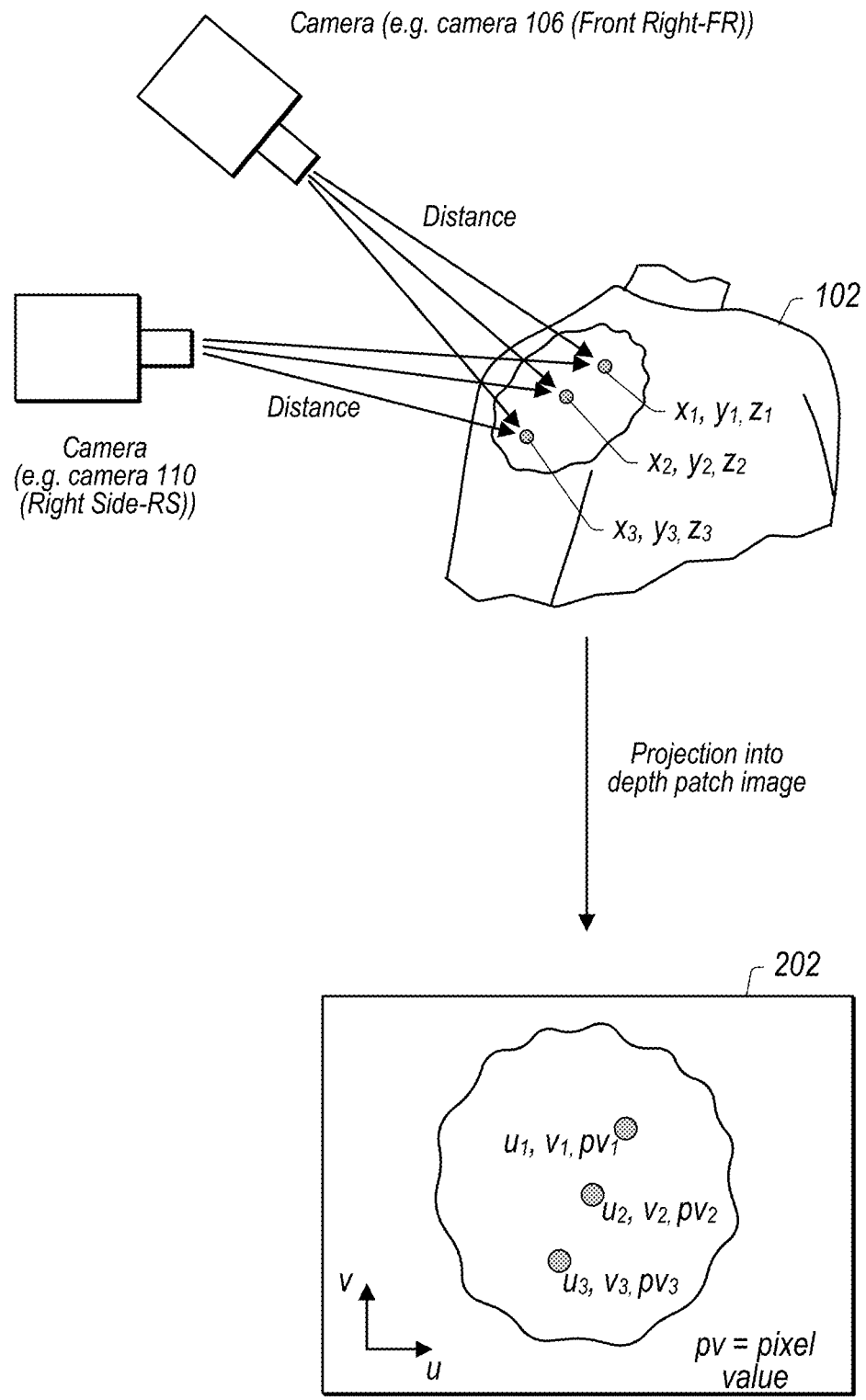
FIG. 2 illustrates depth values for a depth patch image being determined using camera location and camera angle information for multiple cameras that capture images for a same portion of the object or scene from the different locations and/or camera angles, according to some embodiments.

For example, FIG. 2 illustrates depth values for a depth patch image being determined using camera location and camera angle information for multiple cameras that capture images for a same portion of the object or scene from the different locations and/or camera angles, according to some embodiments.

For example, a component of an encoder, such as an atlas constructor 510 (as shown in FIG. 5) may use source camera parameters (e.g. metadata indicating source camera parameters 502, such as camera location and orientation) along with the images captured from the cameras to determine distances to surfaces in the captured images from the cameras at the known locations with the known orientations. In turn, spatial information indicating locations in space for the surfaces may be determined using the determined distances from the cameras and the known locations and orientations of the cameras.

For example, source camera parameters 502 may indicate locations and orientations for right side camera 110 and front right camera 106 that both capture images of a portion of a shoulder of person 102. Moreover, the atlas constructor 510 may determine that the cameras 106 and 110 are both capturing images comprising a same surface of the object (e.g. the portion of the person's shoulder). For example, pixel value patterns in the images may be matched to determine that images from both cameras 106 and 110 are capturing the same portion of the person 102's shoulder. Using the source camera parameters 502 and knowing points in the captured images that are located at a same location in 3D space, the atlas constructor 510 may triangulate a location in 3D space of the matching portions of the captured images (e.g. the portion of person 102's shoulder). Based on this triangulation from the known locations and orientations of cameras 106 and 110, the atlas constructor 510 may determine geometry/spatial information for the portion of the object, such as X, Y, and Z coordinates for points included in the matching portion of the person 102's shoulder as shown in FIG. 2.

Furthermore, the spatial/geometry information may be represented in the form of a depth map (also referred to herein as a depth patch image). For example, as shown in FIG. 2 the spatial information for the person's shoulder, e.g. points with coordinates $X_1, Y_1, Z_1; X_2, Y_2, Z_2;$ and $X_3, Y_3, Z_3$, may be projected onto a flat plane of a depth map, wherein the X and Y spatial information is represented by a location of a given point in the depth map 202. For example, X values may be represented by locations of the points along a width of the depth map 202 (e.g. the "U" direction) and Y values may be represented by locations of the points along the height of the depth map 202 (e.g. the "V" direction). Moreover, the Z values of the points may be represented by pixel values ("pv") associated with the points at locations (U,V). For example, a first point with coordinates in 3D space of $X_1, Y_1, Z_1$ may be represented in the depth map at pixel $(U_1, V_1)$ which has pixel value $pv_1$, wherein darker pixel values indicate lower Z values and lighter pixel values indicate greater Z values (or vice versa).

In some embodiments, depth maps may only be generated for views that are to be included in an atlas. For example, depth maps may not be generated for redundant views or redundant portions of views that are omitted from the atlas. Though, in some embodiments, image data and source camera parameters of all views may be used to generate the depth maps, but the redundant views may not be included in the generated depth maps. For example, whereas cameras 106 and 110 capture redundant information for the person 102's shoulder, a single depth map may be generated for the two views as opposed to generating two redundant depth maps for the person's shoulder. However the images captured from cameras 106 and 110 that redundantly view the person's shoulder from different locations/camera viewing angles may be used to determine the spatial information to be included in the single depth map representing the person's shoulder.

Figure 3:
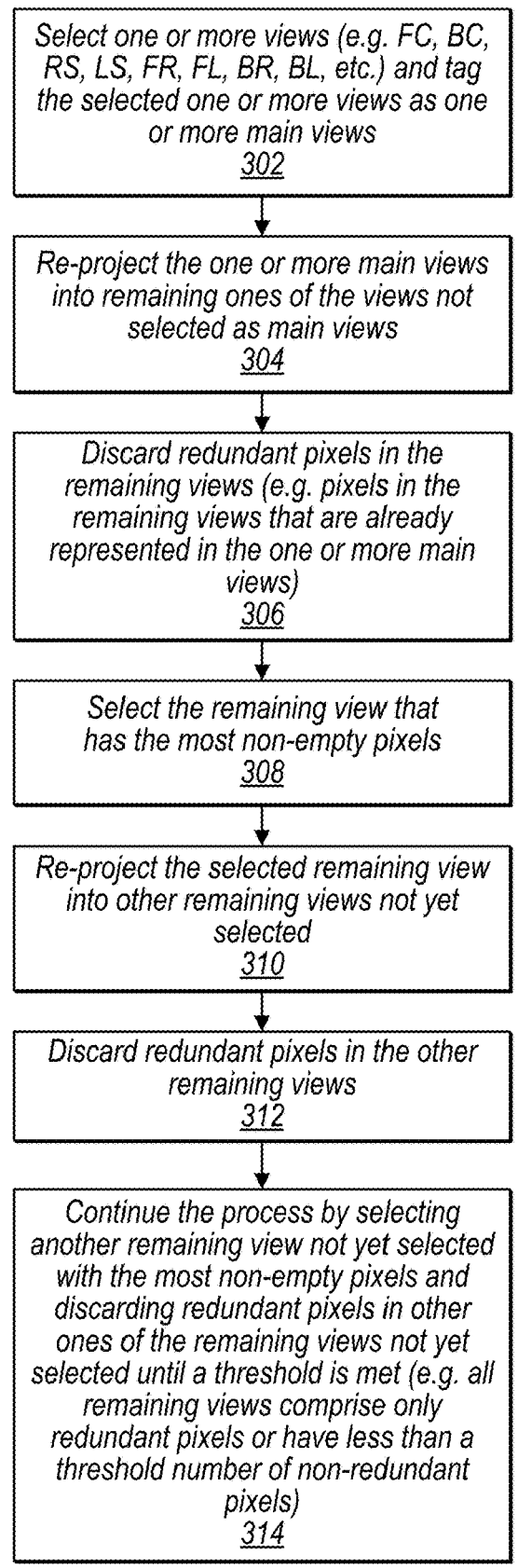
FIG. 3 illustrates a flowchart for an example process for generating an atlas from the captured views, wherein redundant information included in a given view already included in the atlas is omitted from other views that are to be included in the atlas, according to some embodiments.

FIG. 3 illustrates a flowchart for an example process for generating an atlas from the captured views, wherein redundant information already included in a given view already included in the atlas is omitted from other views that are to be included in the atlas, according to some embodiments.

At block 302, a view optimizer (such as view optimizer 506 of the encoder shown in FIG. 5) receives source views comprising both attribute and depth information, such as source views comprising views 120-134 illustrated in FIG. 1D. The view optimizer also selects one of the received views as a main view. In some embodiments, the view optimizer may also receive source camera parameters, such as source camera parameters 502, which indicate locations and orientations of the cameras that captured the source views.

The view optimizer may select one or more main views and tag the selected views as main views. In order to determine a ranking (e.g. ordered list of the views) at block 304 the view optimizer then re-projects the selected one or more main views into remaining ones of the views that were not selected as main views. For example, the front center view (FC) 120 and the back center view (BC) 122 may be selected as main views and may be re-projected into the remaining views, such as views 124-134. At block 306, the view optimizer determines redundant pixels, e.g. pixels in the remaining views that match pixels of the main views that have been re-projected into the remaining views. For example, portions of front right view 128 are redundant with portions of front center view 120, when pixels of front right view 128 are re-projected into front center view 120. In the example, these redundant pixels are already included in the main view (e.g. view 120 from the front center (FC)) and are omitted from the remaining view (e.g. view 128 from the front right (FR)).

The view optimizer (e.g. view optimizer 506) may iteratively repeat this process selecting a next remaining view as a "main view" for a subsequent iteration and repeat the process until no redundant pixels remain, or until a threshold number of iterations have been performed, or another threshold has been met, such as less than X redundant pixels, or less than Y total pixels, etc. For example, at block 308 the re-projection is performed using the selected remaining view as a "main view" to be re-projected into other ones of the remaining views that were not selected as "main views" for this iteration or a previous iteration. Also, at block 312 redundant pixels identified based on the re-projection performed at 310 are discarded. At block 314 the process (e.g. blocks 308-312) are repeated until a threshold is met (e.g. all remaining views comprise only redundant pixels or have less than a threshold number of non-redundant pixels, etc.). The threshold may be measured also be based on all of the remaining views having empty pixels (e.g. they have already been discarded) or all of the remaining views have less than a threshold number of non-empty pixels.

The ordered list of views having non-redundant information may be provided from the view optimizer (e.g. view optimizer 506) to an atlas constructor of an encoder (e.g. atlas constructor 510 as shown in FIG. 5). Additionally, the source camera parameters 502 may be provided from the view optimizer 506 to the atlas constructor 510.

The atlas constructor 510 may prune the empty pixels from the respective views (e.g. the pixels for which redundant pixel values were discarded by the view optimizer 506). This may be referred to as "pruning" the views as shown being performed in atlas constructor 510. The atlas constructor 510 may further aggregate the pruned views into patches (such as attribute patch images and geometry patch images) and pack the patch images into respective image frames.

Figure 4:
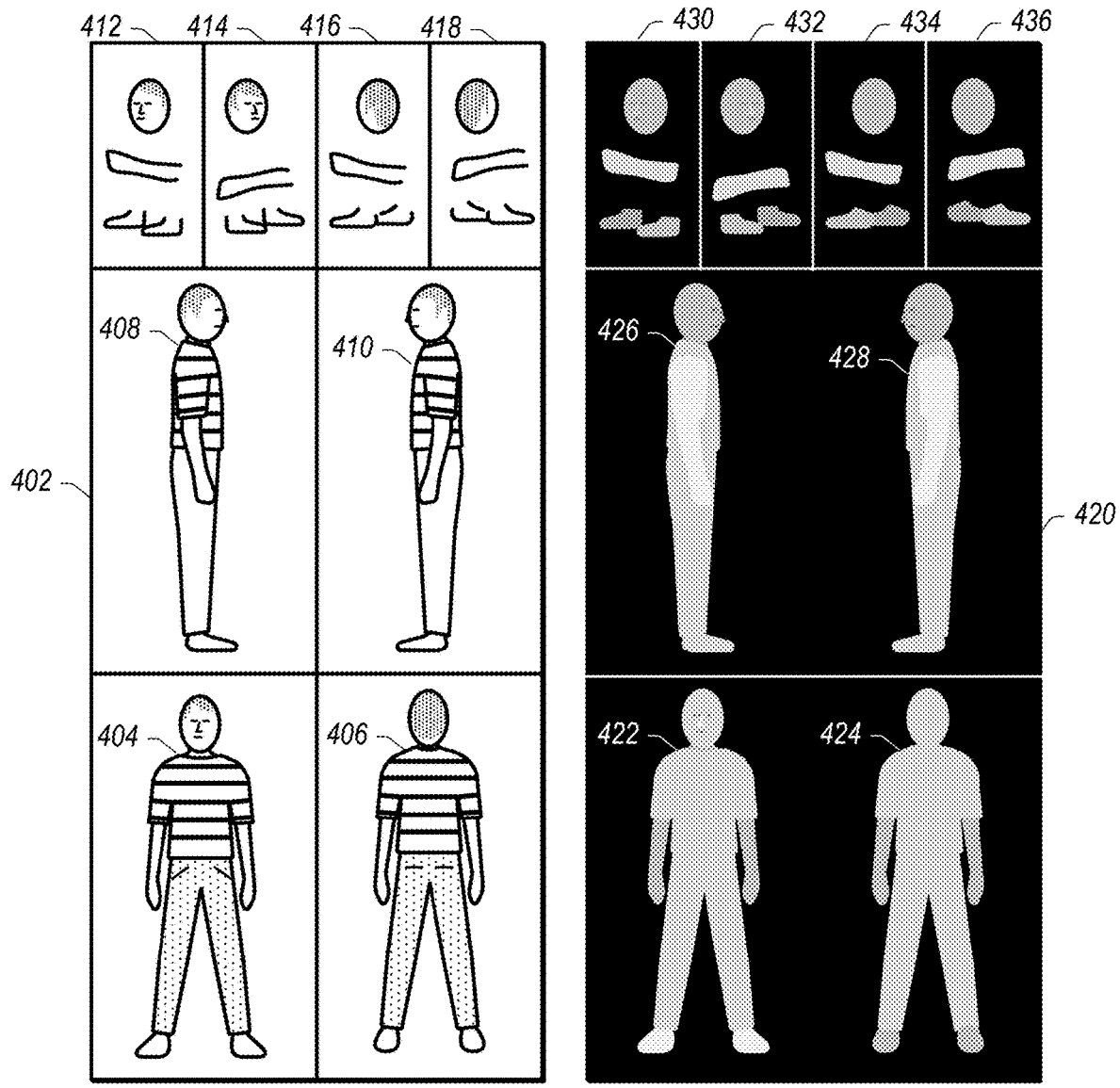
FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

For example, FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

Attribute patch images 404 and 406 for main views 120 and 122 are shown packed in the atlas 402. Also, patch images 408 and 410 comprising non-redundant pixels for views 124 and 126 are shown packed in atlas 402. Additionally, attribute patch images 412, 414, 416, and 418 comprising non-redundant pixels for remaining views 128, 130, 132, and 134 are shown packed in atlas 402.

Atlas 420/depth map 420 comprises corresponding depth patch images 422-436 that correspond to the attribute patch images 404-418 packed into attribute atlas 402.

Figure 8:
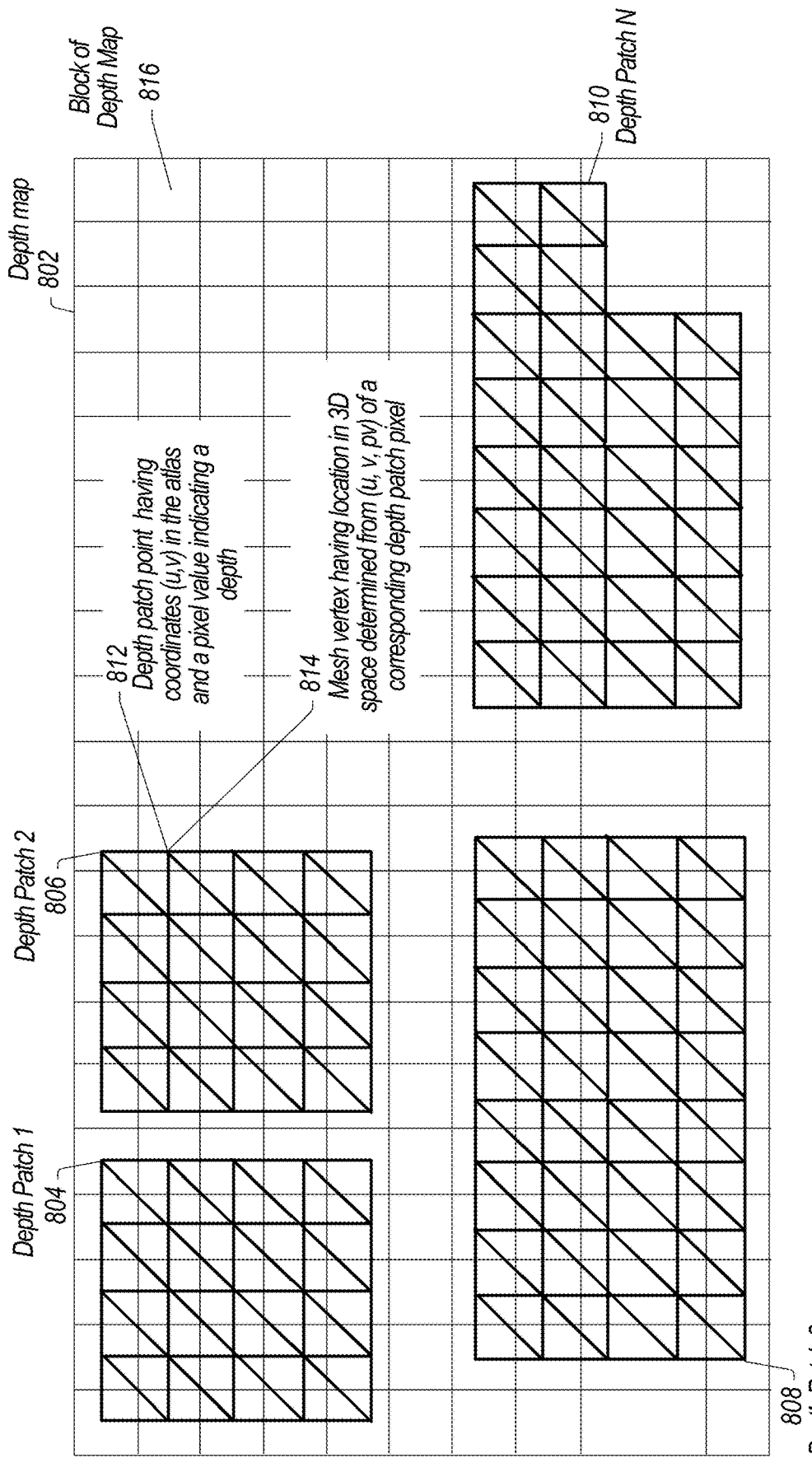
FIG. 8 illustrates depth patch images of a depth map/atlas for which mesh-based representations have been generated, according to some embodiments.

As further described in regard to FIG. 8, the depth patch images 422-436 may be converted into mesh-based representations and further simplified. This may simplify rendering at a receiving device that is to render a reconstructed version of the object or scene, such as person 102. For example, if the depth patch images were encoded as a video image frame as shown in FIG. 4 (e.g. if atlas 420 was encoded as a video image), a rendering device would still have to convert the depth pixel values into point values in 3D space or covert the point values into meshes. However, often times a rendering device has limited computational capacity as compared to an encoding device (e.g. a server doing the encoding may have more computational capacity than a VR or AR device doing the rendering). Thus, generating the meshes and strategically simplifying the meshes at the encoding device (e.g. server) may simplify rendering at the rendering device and reduce a number of vertices in the mesh that are to be rendered at the rendering device (as compared to the rendering device generating the mesh based on the depth patch images). For example, even with the redundant pixels removed as described in FIG. 3, the large number of vertices to be rendered for the non-redundant pixels may overwhelm the capacity of the rendering device. However, by generating the mesh and simplifying the mesh at the encoder, the number of vertices to be rendered at the rendering device may be significantly reduced, thus simplifying the rendering process.

Also, traditional video encoding codecs may smooth values and introduce artifacts in the geometry information (e.g. depth patch images packed in depth map/atlas 420). Thus, even if the rendering device were to have sufficient capacity to render a full quantity of vertices without server-side mesh simplification, distortion or artifacts may be introduced into the rendered geometry at the decoder. In contrast, generating the meshes and using the computational capacity of the encoding device (e.g. server) to strategically simplify the meshes using a distortion analysis may both reduce distortion in the reconstructed geometry and improve rendering speeds at the decoder.

FIG. 5 illustrates a block diagram for an encoder configured to encode three-dimensional (3D) volumetric content using video encoded attribute patch images and simplified mesh-based representations that are mesh encoded, according to some embodiments.

As discussed above, source camera parameters 502 indicating location and orientation information for the source cameras, such as cameras 104-118 as illustrated in FIGS. 1A-1C are provided to the view optimizer 506. Also source views 504 which, include both attributes (e.g. colors, textures, etc.) and depth information are provided to view optimizer 506. The view optimizer 506 determines main views and remaining views as discussed in regard to FIG. 3. The view optimizer 506 and/or the pruner of atlas 510 may further disregard redundant pixels as described in FIG. 3. For example, the view optimizer may mark redundant pixels as empty and the pruner of atlas constructor 510 may prune the empty pixels. Note, the main views and remaining views along with camera lists comprising source camera parameter metadata comprising location and orientation information for the cameras that captured the main and remaining views are provided to atlas constructor 510. As shown in FIG. 5, the atlas constructor 510 prunes the views (main and remaining) to remove empty pixels. The atlas constructor 510 further aggregates the pruned views into patches and packs the patches into a 2D video image frame. For example, in atlas 402 redundant/empty pixels have been pruned from views 128, 130, 132, and 134. Also as shown in atlas 402 for views 128, 130, 132, and 134, the remaining (non-pruned) portions of these views have been aggregated into attribute patch images 412, 414, 416, and 418. These attribute patch images have further been packed into atlas 402, which may have a same size/resolution as the video image frame comprising the attribute patch images (e.g. atlas 402). It is worth pointing out that white space has been included in atlas 402 for ease of illustration. However, in at least some embodiments, the non-redundant portions of the views may be more closely packed into smaller patch images with less open space than what is shown in FIG. 4.

Figure 7:
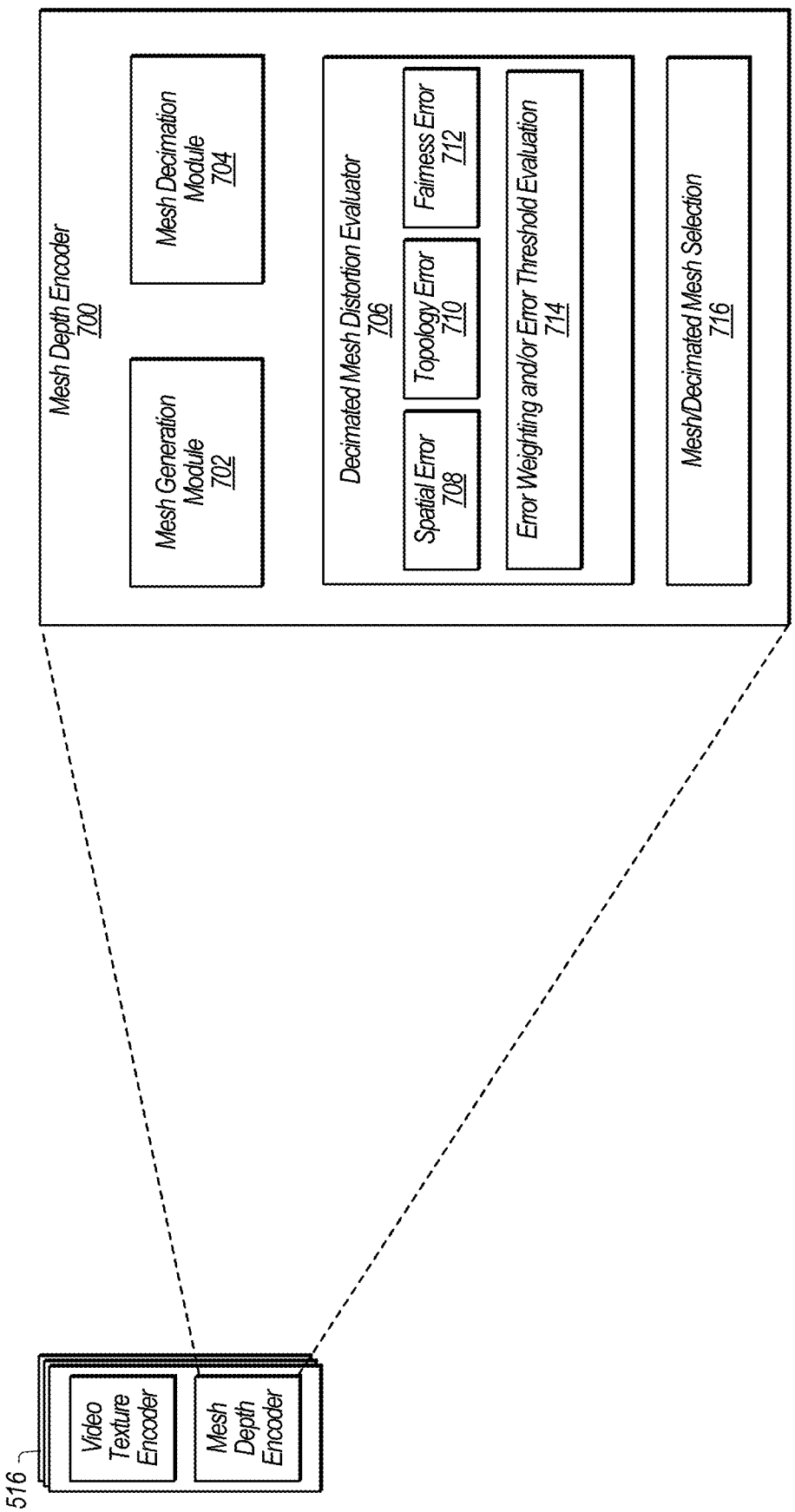
FIG. 7 is a block diagram illustrating additional components of a mesh-based depth encoder that may be used to generate and simplify mesh-based representations as part of the encoder (such as the encoder in FIG. 5), according to some embodiments.

Packed atlas 402 may be provided to encoder 516 which may video encode the attribute patch images and mesh-encode the depth patch images using a mesh generation and mesh simplification as described in FIG. 7.

Additionally, atlas constructor 510 generates an atlas parameters lists 512, such as bounding box sizes and locations of the patch images in the packed atlas. The atlas constructor 510 also generates a camera parameters list 508. For example, atlas constructor 510 may indicate in the atlas parameters list 512 that an attribute patch image (such as attribute patch image 404) has a bounding box size of M×N and has coordinates with a bottom corner located at the bottom left of the atlas. Additionally, an index value may be associated with the patch image, such as that it is a $1^{st}$, $2^{nd}$ etc. patch image in the index. Additionally, camera parameter list 508 may be organized by or include the index entries, such that camera parameter list includes an entry for index position 1 indicating that the camera associated with that entry is located at position X with orientation Y, such as camera 112 (the front center FC camera that captured view 120 that was packed into patch image 404).

Metadata composer 514 may entropy encode the camera parameter list 508 and entropy encode the atlas parameter list 512 as entropy encoded metadata. The entropy encoded metadata may be included in a compressed bit stream long with video encoded packed image frames comprising attribute patch images that have been encoded via encoder 516 and along with mesh-encoded simplified mesh-based-representations that have been encoded via encoder 516.

FIG. 6 illustrates a block diagram for a decoder configured to use video encoded attribute patch images and encoded mesh-based representations to generate a reconstructed version of encoded 3D volumetric content, according to some embodiments.

The compressed bit stream may be provided to a decoder, such as the decoder shown in FIG. 6. The entropy encoded metadata may be directed to a metadata parser 604 and the video encoded image frames comprising attribute patch images packed in the image frames and also the mesh encoded simplified mesh-based representations may be provided to decoder 602, which may video decode the attribute image frames and construct meshes using the mesh-encoded simplified mesh-based representations. The decoded atlas comprising attribute patch images and the meshes may be provided to reference renderer 608 along with atlas patch occupancy maps that have been generated by atlas patch occupancy map generator 606 using the entropy decoded atlas parameter list. Also, the camera view metadata included in the entropy decoded metadata may be provided to reference renderer 608. For example, camera parameter list metadata may be used by reference renderer 608 to select a given view of the 3D volumetric content to render based on a user manipulation of the viewport (e.g. viewing position and viewing orientation information received by the reference renderer 608).

FIG. 7 is a block diagram illustrating additional components of a mesh-based depth encoder that may be used to generate and simplify mesh-based representations as part of the encoder (such as the encoder in FIG. 5), according to some embodiments.

In order to generate and simplify the mesh-based representations, encoder 516 may include a mesh depth encoder 700 that includes a mesh generation module 702 that generates mesh-based representations for depth patch images based on spatial information for the depth patch images, such as U,V and pixel value (pv) information for the depth patch image as shown in FIG. 2.

For example, FIG. 8 illustrates depth patch images of a depth map/atlas for which mesh-based representations have been generated, according to some embodiments.

Depth map 802 includes depth patch images 804, 806, 808, and 810. Note that for ease of illustration depth map 802 is simpler than the depth map/atlas 420 illustrated in FIG. 4. However, depth patch images 804, 806, 808, and 810 may actually be depth patch images 422, 424, 426, 428, etc. (even though they are illustrated as simpler depth patch images in FIG. 8 for ease of illustration). To convert the depth patch images into mesh-based representations, vertices may be assigned for the points with (U,V) coordinates in the depth patch image. Additionally, depths of the vertices may be assigned based on the pixel values of the points with (U,V) coordinates. Also, edges may be formed between the vertices to create triangles as shown in FIG. 8. The pixel values (pv) may be converted into Z values (or height out of the plain of the depth map) and the vertices of the mesh may be located at these points, wherein (U,V, pv) are converted back to X, Y, Z.

However, without simplification such an approach may generate a large number of vertices. Thus, returning to FIG. 7, mesh decimation operation module 704 may perform one or more decimation operations to remove vertices or edges from the mesh-based representations generated in FIG. 8 to create simplified versions of the mesh-based representations. For example, a vertex removal decimation operation, as shown in FIG. 9, may be performed by mesh decimation operation module 704. Also, a partial or full edge collapse as shown in FIGS. 10A and 10B, respectively, may be performed by mesh decimation operation module 704.

The simplified mesh-based representation resulting from mesh decimation operation module 704 may be evaluated by decimated mesh distortion evaluator 706. In some embodiments, decimated mesh distortion evaluator may evaluate the decimated mesh based on one or more distortion criteria, such as spatial error, topology error, fairness, etc. Also different types of distortion may be weighted differently. For example, fairness distortion may be weighted differently than spatial distortion or topology distortion. In some embodiments, spatial distortion may be determined as differences between spatial locations of points included in the respective depth patch images and points falling on surfaces of the simplified version of the mesh-based representation resulting from applying the selected decimation operation. For example, the X, Y, Z values determined from the depth patch images for the points of the depth path image may be compared to closest points falling on a triangle of the mesh to determine spatial error. As an example, consider a decimation operation that removes a vertex. The X, Y, Z location is known for the point corresponding to the vertex prior to removal, such that after removal a location of the triangle surface at the given X,Y location can be compared to the Z value to determine a spatial error in the depth resulting from applying the vertex removal (e.g. decimation operation).

In some embodiments, topology error may be determined as deviations in topology between the respective mesh-based representation and the simplified version of the mesh-based representation. For example, the topology of the mesh-based representation prior to performing the decimation operation can be compared to the resulting mesh after applying the decimation operation and differences in topology can be determined.

In some embodiments, fairness may be determined as deviations in polygon shape and polygon normal vector orientation between the respective mesh-based representation and the simplified version of the mesh-based representation.

In order to evaluate these different types of distortion, decimated mesh distortion evaluator 706 includes spatial error evaluator 708, topology error evaluator 710, and fairness error evaluator 712. Additionally, in some embodiments decimated mesh distortion evaluator 706 includes error weighting and/or error threshold evaluator 714. For example, the error weighting and/or error threshold evaluator 714, may weigh the different types of errors differently to determine a composite error score that is compared to an error/distortion threshold or may evaluate each type of error against a separate error/distortion threshold for that type of error, or may both evaluate a composite error and individual types of error against respective error/distortion thresholds. Mesh depth encoder 700 also includes mesh/decimated mesh selection module 716 which may select a simplified mesh-based representation upon which one or more rounds of decimation operations and evaluations have been performed. For example a most simplified version of the mesh-based representation that does not violate any (or specified ones) of the distortion thresholds may be selected as the selected simplified version of the mesh-based representation that is to be mesh encoded and included in the bit stream.

In some embodiments, mesh decimation operation module 704 decimated mesh evaluator 706, and mesh/decimated mesh selection module 716 may decimate and evaluate meshes included in a group of frames as a group, wherein a same set of decimation operations is performed for a given mesh-based representation repeated in each of the frames of the group of frames. Also, in some embodiments, the distortion evaluation may ensure that the distortion thresholds are not exceed for any of the frames of the group of frames when the selected decimation operations are performed. Thus the resulting simplified meshes may have a same connectivity across the group of frames. This may improve the mesh encoding because one set of connectivity information may be signaled for the group of frames as opposed to signaling different connectivity information for each frame of the group of frames.

Figure 11A:
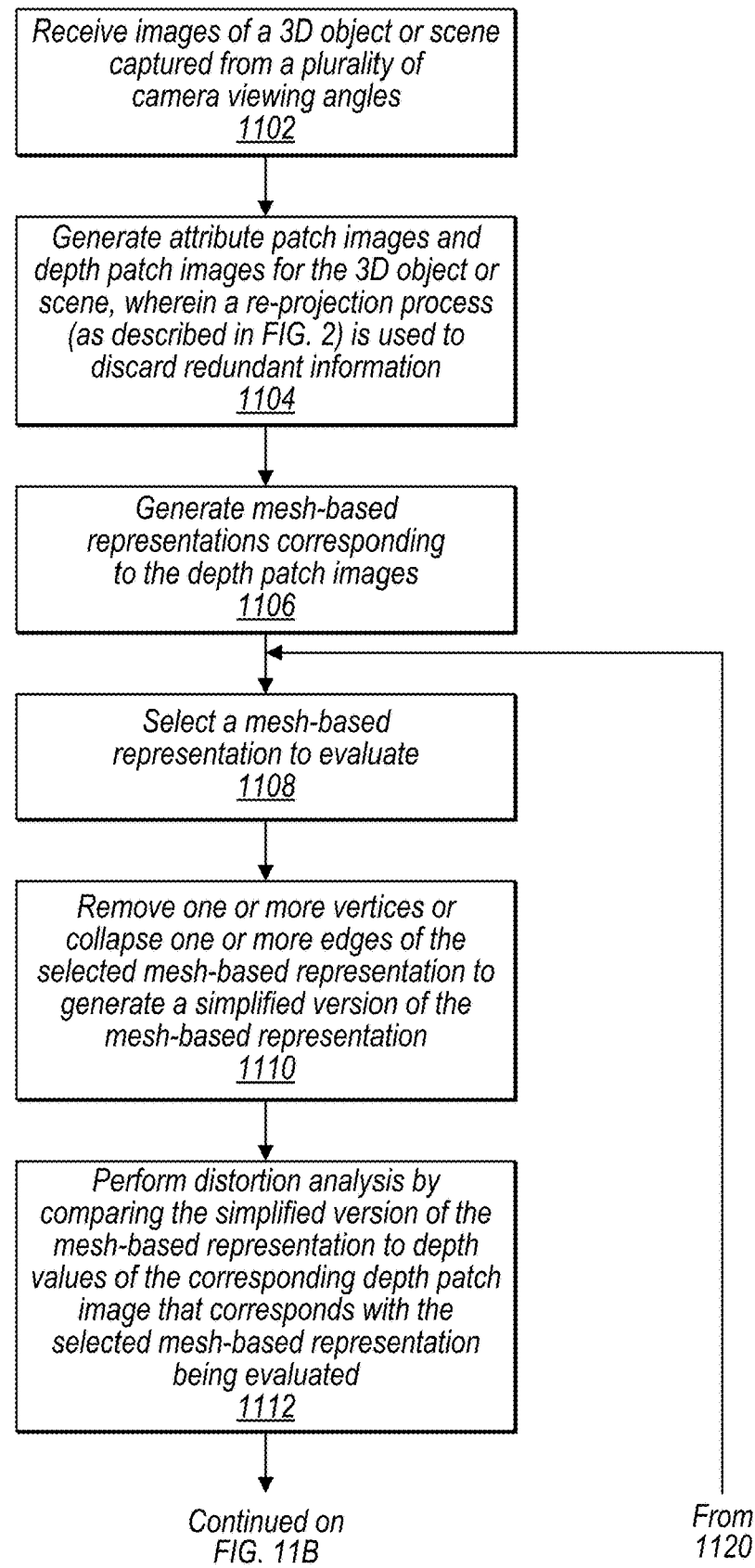
FIGS. 11A-11B illustrates a flow chart for encoding 3D volumetric content by generating simplified mesh-based representations representing geometry information for the 3D volumetric content and generating an atlas comprising 2D attribute patch images representing attribute information for the 3D volumetric content, according to some embodiments.
Figure 11B:
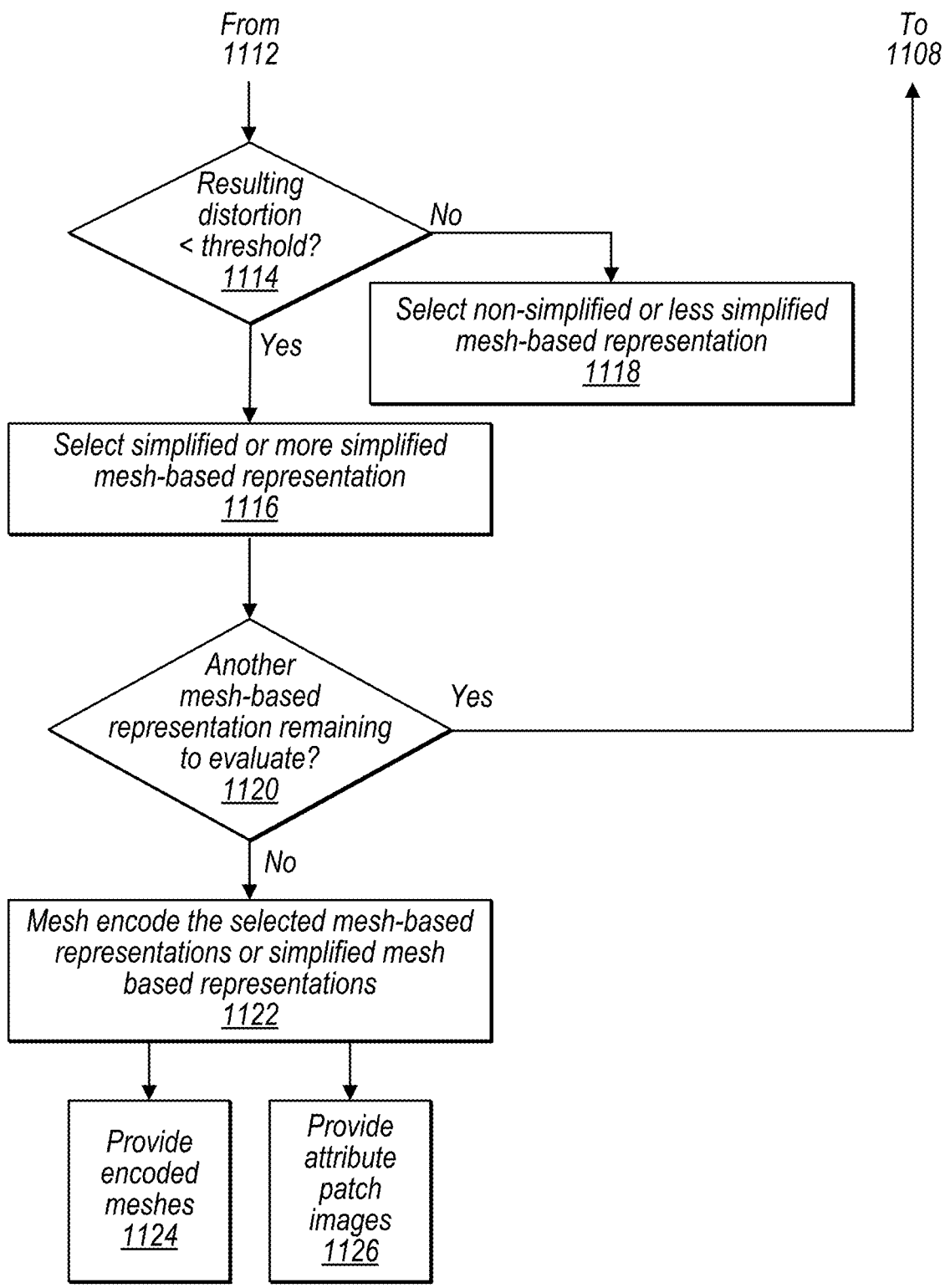

FIGS. 11A-11B illustrates a flow chart for encoding 3D volumetric content by generating simplified mesh-based representations representing geometry information for the 3D volumetric content and generating an atlas comprising 2D attribute patch images representing attribute information for the 3D volumetric content, according to some embodiments.

At block 1102, an encoding computing device (e.g. encoder) receives images of a 3D object or scene captured from a plurality of camera angles and/or camera locations. For example, the encoder illustrated in FIG. 5 may receive images, such as those shown in FIG. 1D captured by the cameras illustrated in FIGS. 1A-1C. At block 1104, the encoder generates attribute patch images and depth patch images/depth maps for the object or scene. Also, the encoder uses a re-projection process (such as described in FIG. 2) to optimize the views used to create the attribute patch images and the depth patch images/depth maps. For example, the re-projection process may disregard redundant pixels. At block 1106, the encoder generates mesh-based representations corresponding to the depth patch images, such as shown in FIG. 8.

At block 1108, the encoder selects a first (or next) mesh-based representation to evaluate in order to determine if the mesh-based representation can be simplified without introducing distortion that exceeds one or more distortion thresholds for one or more distortion criteria, such as distortion thresholds for spatial distortion, topology distortion, fairness distortion, a composite distortion measurement, etc.

As part of performing the simplification/distortion evaluation, at block 1110 the encoder performs a first decimation operation to simplify the selected mesh-based representation being evaluated. For example, the encoder may remove one or more vertices or collapse one or more edges of the selected mesh-based representation to generate a simplified version of the mesh-based representation. At block 1112, the encoder performs a distortion analysis by comparing the simplified version of the mesh-based representation to depth values of the corresponding depth patch image that corresponds with the selected mesh-based representation being evaluated. Also, the encoder may compare the simplified mesh-based representation to a prior version of the mesh-based representation without the decimation operation applied to determine differences (e.g. distortion) introduced by applying the decimation operation.

For example, the encoder may determine spatial distortion by comparing depth values of a surface of the mesh at a given location on the mesh to a depth value for a corresponding pixel in the depth patch image. Said another way, a pixel in the depth patch image with coordinates (U,V) and pixel value pv representing a depth, may be compared to a point on the surface located at location X,Y, wherein X,Y correspond to pixel U,V of the depth patch image projected from the depth patch image into 3D space. Furthermore, the depth value Z at point X,Y may be compared to the corresponding depth value pv of the depth map pixel that is projected into 3D space. In this way, a difference in the depth values at point X,Y,Z may be determined by comparing what the depth value is at the point in the simplified mesh-based representation as compared to what the depth value would have been if a vertex with coordinates X,Y,Z had been placed at that point location, wherein the vertex with coordinates X,Y,Z is generated by projecting depth map pixel (U,V, pv) into 3D space. Additionally, or alternatively, other distortion analysis may be performed and the determined levels of distortion compared to a corresponding distortion threshold for the other types of distortion analysis. For example, a topology distortion analysis or a fairness distortion analysis may alternatively or additionally be performed at block 1112.

At block 1114, the encoder determines if distortion introduced due to performing the decimation operation as determined via the distortion analysis performed at block 1112 exceeds one or more corresponding distortion thresholds for the respective type of distortion. If so, at block 1118 an earlier version of the mesh-based representation without the decimation operation that resulted in excessive distortion is selected. For example, a prior version of the mesh-based representation with less decimation operations applied, or that has not been decimated, is selected as opposed to the decimated version that resulted in excessive distortion.

If the distortion threshold is not exceed, at bock 1116 the encoder selects the simplified version of the mesh-based representation with the decimation operation applied. Note that as shown in further detail in FIGS. 14A-14C, in some embodiments, decimation operations may be iteratively applied to determine a simplified mesh-based representation that has been further simplified by repeating blocks 1110 through 1118 for one or more additional iterations without resulting in excessive distortion.

At block 1120, the encoder determined if there is another mesh-based representation to evaluate, if so the process reverts to block 1108 and is repeated for the next mesh-based representation to evaluate. In some embodiments, evaluation of different ones of the mesh-based representations may be performed in parallel, such that the encoder does not need to complete the evaluation of a first mesh-based representation before beginning to evaluate a next mesh-based representation.

At block 1122 the selected mesh-based representations or selected simplified mesh-based representations are mesh encoded. At block 1124, the encoder provides the mesh encoded mesh-based representations in an output bit stream. Also, at block 1126 the encoder provides the attribute patch images, which may be provided as a video encoded atlas comprising the attribute patch images that is also included in the output bit stream.

Figure 12:
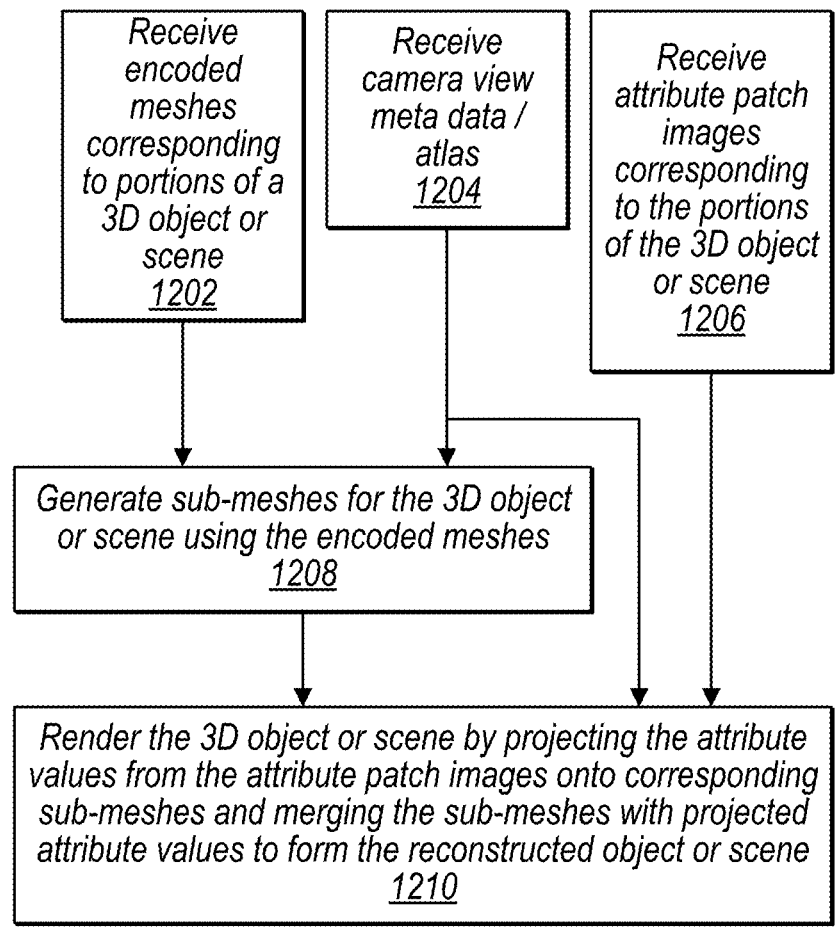
FIG. 12 illustrates a flow chart for reconstructing 3D volumetric content using video encoded attribute information and geometry information encoded using simplified mesh-based representations, according to some embodiments.

FIG. 12 illustrates a flow chart for reconstructing 3D volumetric content using video encoded attribute information and geometry information encoded using simplified mesh-based representations, according to some embodiments.

At block 1202, a decoding computer device (e.g. decoder) receives encoded meshes corresponding to portions of a 3D object or scene (e.g. the decoder may receive the mesh-encoded simplified mesh-based representations provided by the encoder at block 1124). At block 1204, the decoder also receives camera view metadata and atlas metadata, such as a camera parameter list 508 and an atlas parameter list 512 (as shown in FIGS. 5 and 6). At block 1206 the decoder receives attribute patch images corresponding to the portions of the 3D object or scene represented by the encoded meshes received at block 1202. In some embodiments, the atlas parameter list received at block 1204 may be used to match corresponding sets of attribute patch images and corresponding mesh-based representations that both correspond to a same portion of the 3D object or scene.

At block 1208, the decoder generates sub-meshes each corresponding to a portion of the 3D object or scene, wherein the sub-meshes can be combined into a larger mesh representing the whole 3D object or scene. At block 1210, the decoder renders the 3D object or scene by projecting the attribute values of the attribute patch images onto the corresponding sub-meshes and further merges the sub-meshes to form the larger mesh representing the 3D object or scene.

Figure 13:
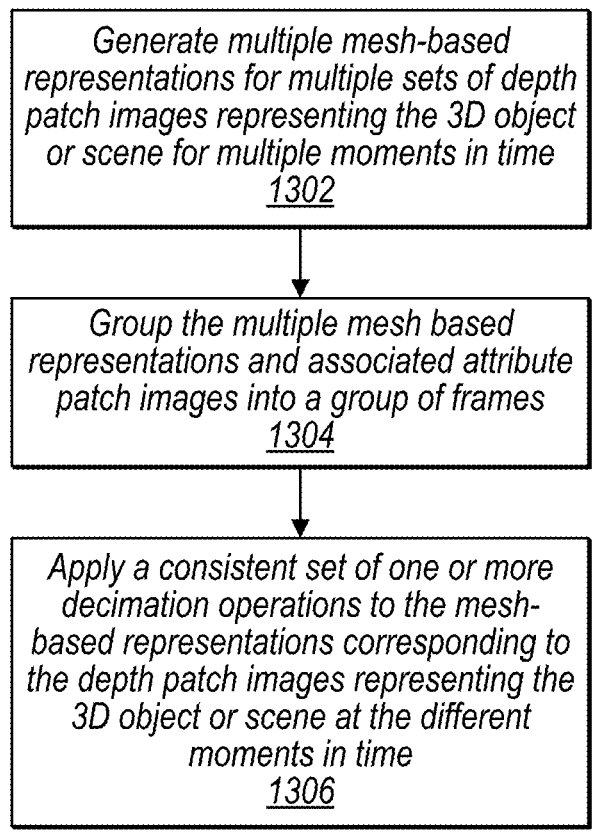
FIG. 13 illustrates a flow chart for grouping mesh-based representations into a group of frames and applying decimation operations to simplify the meshes in the different groups of frames in a consistent manner, according to some embodiments.

FIG. 13 illustrates a flow chart for grouping mesh-based representations into a group of frames and applying decimation operations to simplify the meshes in the different groups of frames in a consistent manner, according to some embodiments.

In some embodiments, the encoding process as described in FIG. 11 and the decoding process as described in FIG. 12 can be performed for a group of frames (GoF) representing the 3D object or scene at multiple moments in time.

For example, at block 1302 the encoder generates multiple mesh-based representations for multiple sets of depth patch images representing the 3D object or scene at multiple moments in time. At block 1304, the encoder groups the multiple mesh based representations and associated attribute patch images into a group of frames. At block 1306, the encoder applies a consistent set of one or more decimation operations to the mesh-based representations of the group of frames corresponding to the depth patch images representing the 3D object or scene at the different moments in time.

In a similar manner, a decoder may receive a bit stream comprising encoded meshes and encoded attribute patch images for the group of frames and may reconstruct the 3D object or scene at the different moments in time. Because consistent decimation operations are applied, the encoded meshes received by the decoder may have consistent connectivity across the frames of the group of frames. Thus, the decoder may take advantage of this property of a group of frames (GoF) to accelerate reconstruction of the meshes. Also in some embodiments, less information may be signaled (than would be the case if GoFs were not used) because the connectivity information for the encoded meshes does not need to be repeated for each moment in time.

Figure 14A:
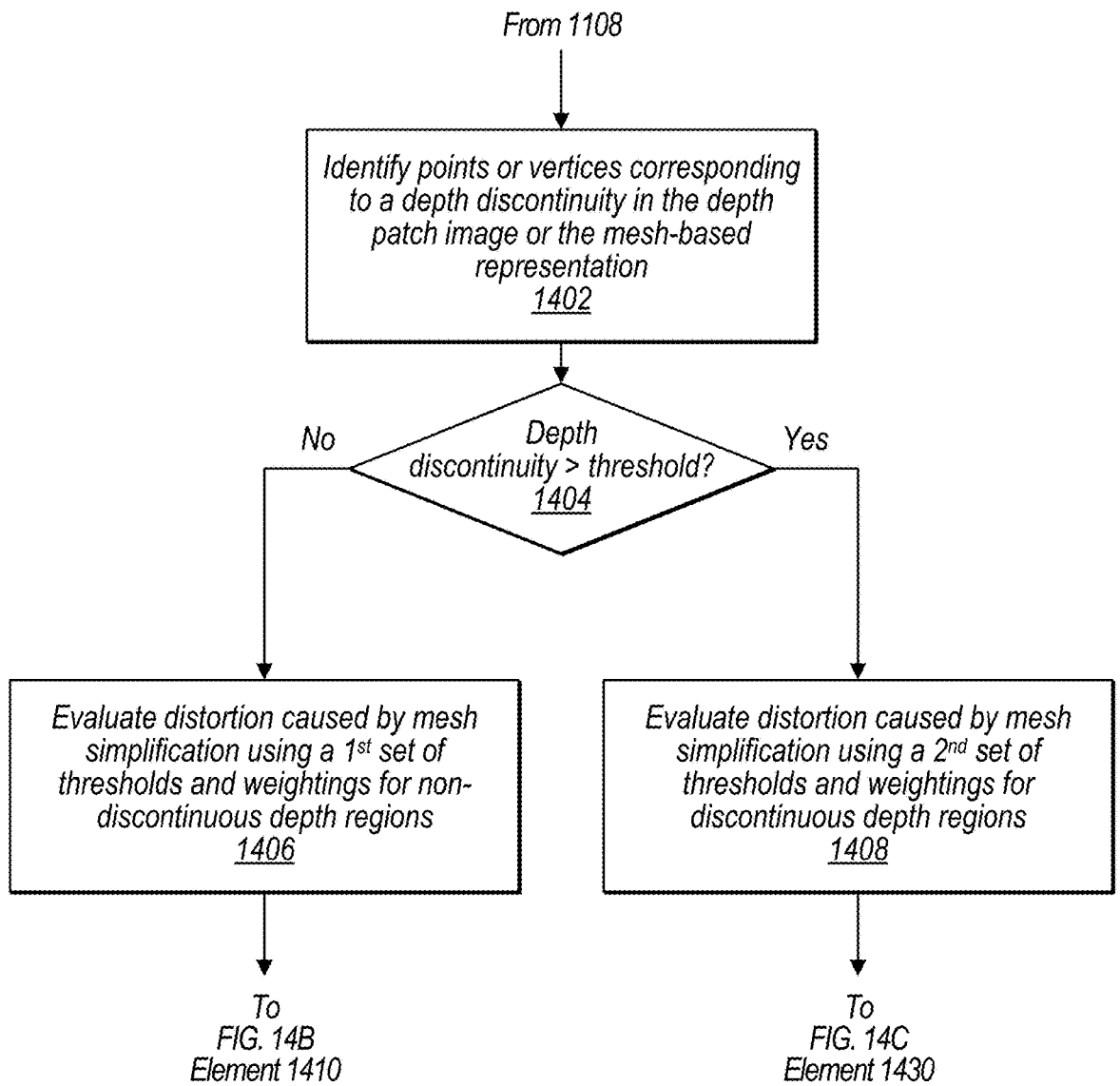
Figure 14B:
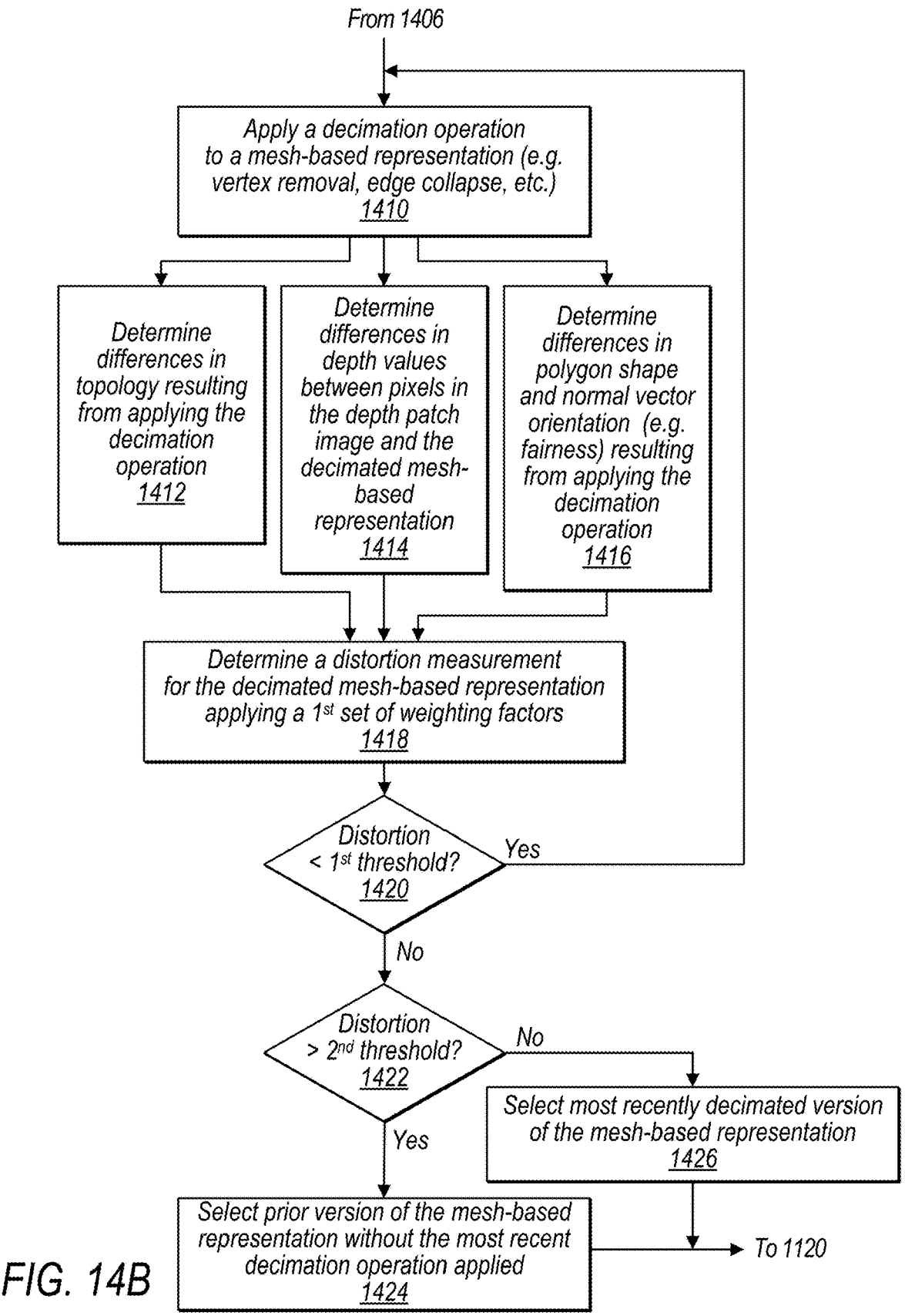

FIGS. 14A-14C illustrate a flow chart providing additional details on how decimation operations are selected and applied to simplify the mesh-based representations, according to some embodiments.

In some embodiments, the mesh simplification and distortion analysis process as described in blocks 1110 through 1118 of FIGS. 11A/11B may further take into account depth discontinuities and apply different distortion thresholds and/or different weightings to particular types of distortion based on whether or not a mesh being simplified includes a depth discontinuity.

For example, following block 1108, the encoder may reach block 1402 and may identify points or vertices corresponding to a depth discontinuity in the depth patch image or the mesh-based representation being evaluated. At block 1404 the encoder may determine if the depth discontinuity is greater than a threshold level of discontinuity. Depending on whether or not the depth discontinuity is greater or less than the threshold level of depth discontinuity, the encoder may apply different sets of distortion thresholds and weightings in the distortion analysis, as shown in FIG. 14A via the divergent paths to block 1406, wherein a $1^{st}$ set of thresholds and weightings is applied or to block 1408, wherein a $2^{nd}$ set of thresholds and weightings is applied. In some embodiments, more than two sets of distortion thresholds and weightings may be used for different gradations of depth discontinuities.

At block 1410, the encoder applies a decimation operation to the mesh-based representation being evaluated for simplification. At block 1412 topology distortion is determined as a result of the applied decimation operation, at block 1414 spatial distortion is determined as a result of the applied decimation operation, and at block 1416 fairness distortion is determined as a result of the applied decimation operation. At block 1418 a first set of weighting factors is applied to weight the distortions determined at blocks 1412, 1414, and 1416.

At block 1420, the encoder determines if the weighted composite distortion is less than a $1^{st}$ distortion threshold. If so, another decimation operation is applied at 1410 and updated distortions are determined and weighted. If not, at block 1422 the encoder determines whether the weighted composite distortion is greater than a $2^{nd}$ distortion threshold. If so, the prior version of the mesh-based representation without the most recent decimation operation applied is selected, if not the most recent version with the latest decimation operation applied is selected. In this way, the given mesh-based representation is decimated such that the $1^{st}$ decimation threshold is exceed, but not so much that the $2^{nd}$ decimation threshold is exceeded. Thus the mesh-based representation is simplified such that introduced distortion is within an acceptable range of distortion bound by the $1^{st}$ and $2^{nd}$ distortion thresholds.

A similar process is carried out in FIG. 14C at blocks 1430 through 1446 using a different set of weighting factors and different distortion thresholds (e.g. a $3^{rd}$ and a $4^{th}$ distortion threshold) that provide a different bounding for acceptable distortion for a mesh-based representation comprising a depth discontinuity that is greater than the depth discontinuity threshold evaluated at block 1404 of FIG. 14A.

Example Computer System

Figure 15:
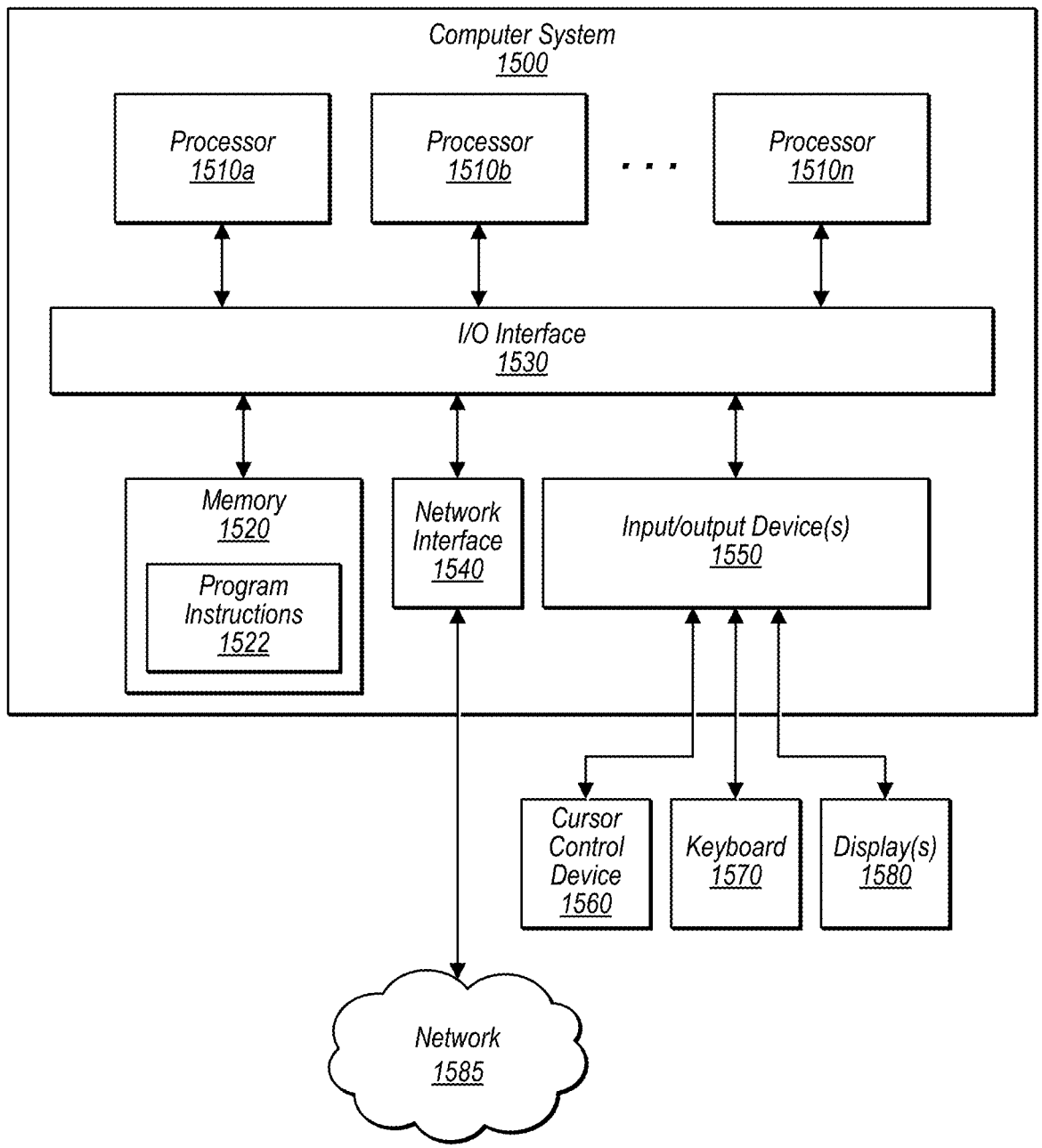
FIG. 15 illustrates an example computer system that may implement an encoder or decoder, according to some embodiments.

FIG. 15 illustrates an example computer system 1500 that may implement an encoder or decoder or any other ones of the components described herein, (e.g., any of the components described above with reference to FIGS. 1-14), in accordance with some embodiments. The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, computer system, handheld computer, workstation, network computer, a camera, a set top box, a mobile device, a consumer device, video game console, handheld video game device, application server, storage device, a television, a video recording device, a wearable device such as a wrist watch or a wearable display, a peripheral device such as a switch, modem, router, or in general any type of computing or electronic device.

Various embodiments of an encoder or decoder, as described herein may be executed in one or more computer systems 1500, which may interact with various other devices. Note that any component, action, or functionality described above with respect to FIGS. 1-14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments one or more of processors 1510 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1510 may include additional types of processors, such as graphics processing units (GPUs), application specific integrated circuits (ASICs), etc. In multiprocessor systems, each of processors 1510 may commonly, but not necessarily, implement the same ISA. In some embodiments, computer system 1500 may be implemented as a system on a chip (SoC). For example, in some embodiments, processors 1510, memory 1520, I/O interface 1530 (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1520 may be configured to store compression or decompression program instructions 1522 and/or sensor data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement an image sensor control application incorporating any of the functionality described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard, the Universal Serial Bus (USB) standard, IEEE 1394 serial bus standard, etc. for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, tablets, wearable devices (e.g. head-mounted displays, virtual reality displays, augmented reality displays, etc.). Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow

What is claimed is:

1. A non-transitory, computer-readable, medium storing program instructions, that when executed on or across one or more processors, cause the one or more processors to:
    generate mesh-based representations and attribute patch images for a three-dimensional (3D) object or scene, based on camera output representing views of the 3D object or scene from a plurality of viewing angles; and
    for respective ones of the mesh-based representations,
        remove one or more vertices or edges of the respective mesh-based representation to generate a simplified version of the respective mesh-based representation,
        perform a distortion analysis for the respective simplified version of the mesh-based representation, wherein:

if an amount of distortion caused by removing the one or more vertices or edges is less than a threshold amount, the simplified version of the mesh-based representation is selected, and if the amount of distortion caused by removing the one or more vertices or edges is equal to or greater than the threshold amount, the mesh-based representation that has not had at least some of the one or more edges or vertices removed is selected; and provide the selected mesh-based representations that have been simplified based on the distortion analysis and the atlas comprising the corresponding attribute patch images.

2. The non-transitory, computer-readable, medium of claim 1, wherein the distortion analysis compares the respective simplified version of the mesh-based representation to an initially generated version of the respective mesh-based representation.

3. The non-transitory, computer-readable, medium of claim 1, wherein the program instructions, when executed on or across the one or more processors, further cause the one or more processors to:

encode the selected mesh-based representations using a mesh encoding format; and encode the attribute patches using a video-based encoding format, wherein providing the selected mesh-based representations that have been simplified based on the distortion analysis comprises providing the encoded mesh-based representations, and wherein providing the atlas comprising the corresponding attribute patch images comprises providing the encoded attribute patches.

4. The non-transitory, computer-readable, medium of claim 1, wherein the program instructions, when executed on or across the one or more processors, cause the one or more processors to:

provide a set of selected mesh-based representations for a plurality of versions of the 3D object or scene for a plurality of moments in time, wherein the removal of the one or more vertices or edges is consistently applied across two or more of the versions of the 3D object or scene corresponding to two or more of the plurality of moments in time such that selected mesh-based representations for the two or more versions of the 3D object or scene share a common mesh connectivity.

5. The non-transitory, computer-readable, medium of claim 1, wherein the program instructions, when executed on or across the one or more processors, cause the one or more processors to:

generate respective atlases comprising attribute patch images for a plurality of versions of the 3D object or scene for a plurality of moments in time;

generate mesh-based representations for the plurality of versions of the 3D object or scene for the plurality of moments in time;

group the respective atlases and corresponding mesh-based representations for a sub-set of the plurality of moments in time into a group of frames;

consistently remove one or more vertices or edges from the respective versions of respective ones of the mesh-based representation at different ones of the moments in time included in the group of frames;

perform the distortion analysis for simplified ones of the respective versions of the mesh-based representations for the different moments in time included in the group of frames that have had the one or more vertices or edges removed; and consistently select respective simplified ones of the mesh-based representations for the different moments in time included in the group of frames such that the selected simplified ones of the respective versions of the mesh-based representations for the different moments in time included in the group of frames share a common mesh connectivity.

6. The non-transitory, computer-readable, medium of claim 5, wherein the distortion analysis measures geometry distortion introduced in each of the frames of the group of frames, and wherein to remove the one or more vertices or edges, the program instructions, when executed on or across the one or more processors, cause the one or more processors to:

perform an edge collapse to collapse an edge such that two vertices at opposing ends of the edge are combined into a single vertex in a given one of the mesh-based representations, wherein the edge collapse is consistently applied for each occurrence of a version of the given mesh-based representation for the different versions of the 3D object or scene included in the group of frames.

7. The non-transitory, computer-readable medium of claim 6, wherein to remove the one or more vertices or edges the program instructions, when executed on or across the one or more processors, further cause the one or more processors to:

determine a location in 3D space to locate the single vertex resulting from the edge collapse based, at least in part, on the distortion analysis, wherein the determined location is consistently applied for each occurrence of the given mesh-based representation for the different versions of the 3D object or scene in the group of frames.

8. The non-transitory, computer-readable, medium of claim 5, wherein the distortion analysis measures distortion introduced in each of the frames of the group of frames, and wherein to remove the one or more vertices or edges, the program instructions, when executed on or across the one or more processors, cause the one or more processors to:

remove a vertex from a given on of the mesh-based representations such that at least some edges previously connected to the removed vertex instead connect to one or more respective remaining vertices of the given mesh-based representation, wherein the vertex removal is consistently applied for each occurrence of the given mesh-based representation for the different versions of the 3D object or scene in the group of frames.

9. The non-transitory, computer-readable, medium of claim 1, wherein, the program instructions, when executed on or across the one or more processors, cause the one or more processors to:

select a decimation operation to apply to the respective mesh-based representation based on spatial differences between spatial locations of points included in the respective depth patches and points falling on surfaces of the simplified version of the mesh-based representation resulting from applying the selected decimation operation, wherein the decimation operation is selected from a group of decimation operations comprising: edge collapse or vertex removal.

10. The non-transitory, computer-readable, medium of claim 9, wherein the selection of the decimation operation is further based on topology preservation such that deviations in topology between the respective mesh-based representation and the simplified version of the mesh-based representation are used as a factor in selecting the decimation operation.

11. The non-transitory, computer-readable, medium of claim 9, wherein the selection of the decimation operation is further based on fairness such that deviations in polygon shape and polygon normal vector orientation between the respective mesh-based representation and the simplified version of the mesh-based representation are used as a factor in selecting the decimation operation.

12. The non-transitory, computer-readable, medium of claim 11, wherein, the program instructions, when executed on or across the one or more processors, cause the one or more processors to:
identify, for a given mesh-based representation being simplified, points corresponding to one or more depth discontinuities wherein depth values of the points relative to other ones of the points change more than a threshold amount;
wherein, in selecting the decimation operation, spatial differences for the identified points corresponding to the one or more depth discontinuities are weighted more heavily than spatial differences for other points not corresponding to a depth discontinuity.

13. A device, comprising:
a memory storing program instructions; and
one or more processors, wherein the program instructions, when executed on or across the one or more processors, cause the one or more processors to:
generate mesh-based representations and attribute patch images for a three-dimensional (3D) object or scene, based on camera output representing views of the 3D object or scene from a plurality of viewing angles; and
for respective ones of the mesh-based representations, remove one or more vertices or edges of the respective mesh-based representation to generate a simplified version of the respective mesh-based representation,
perform a distortion analysis for the respective simplified version of the mesh-based representation, wherein
if an amount of distortion caused by removing the one or more vertices or edges is less than a threshold amount, the simplified version of the mesh-based representation is selected, and
if the amount of distortion caused by removing the one or more vertices or edges is equal to or greater than the threshold amount, the mesh-based representation that has not had at least some of the one or more edges or vertices removed is selected; and
provide the selected mesh-based representations that have been simplified based on the distortion analysis and the atlas comprising the corresponding attribute patch images.

14. The device of claim 13, wherein the program instructions, when executed on or across the one or more processors, cause the one or more processors to:
provide a set of selected mesh-based representations for a plurality of versions of the 3D object or scene at a plurality of moments in time,
wherein the distortion analysis is performed for each of the moments in time and takes into account distortion introduced in each of a plurality of frames corresponding to the plurality of versions of the 3D object or scene at the plurality of moments in time.

15. The device of claim 14, wherein the program instructions, when executed on or across the one or more processors, cause the one or more processors to:
select a decimation operation to apply to the respective mesh-based representations based on the distortion introduced in each of a plurality of frames corresponding to the plurality of versions of the 3D object or scene at the plurality of moments in time,
wherein the decimation operation is selected from a group of decimation operations comprising: edge collapse or vertex removal.

16. The device of claim 15, wherein the same decimation operation is used to remove a same number of vertices or a same number of edges from a given mesh-based representation in each of the frames across the plurality of frames.

17. The device of claim 16, wherein the program instructions, when executed on or across the one or more processors, cause the one or more processors to:
determine, for the selected decimation operation, a position location for a resulting vertex resulting from applying an edge removal, or
determine for the selected decimation operation, edge connections for remaining vertices subsequent to removing a vertex,
wherein, for the given mesh-based representation, the decimation operation is consistently applied for each of the frames across the plurality of frames of the group of frames.

18. The device of claim 13, further comprising:
one or more cameras configured to capture images of the 3D object or scene from the plurality of camera viewing angles or locations for viewing the 3D object or scene.

19. A method, comprising:
generating mesh-based representations and attribute patch images for a three-dimensional (3D) object or scene, based on camera output representing views of the 3D object or scene from a plurality of viewing angles; and
for respective ones of the mesh-based representations, removing one or more vertices or edges of the respective mesh-based representation to generate a simplified version of the respective mesh-based representation, and
performing a distortion analysis for the respective simplified version of the mesh-based representation, wherein
if an amount of distortion caused by removing the one or more vertices or edges is less than a threshold amount, the simplified version of the mesh-based representation is selected, and
if the amount of distortion caused by removing the one or more vertices or edges is equal to or greater than the threshold amount, the mesh-based representation that has not had the one or more edges or vertices removed is selected.

20. The method of claim 19, wherein said removing the one or more vertices or edges is performed via:
applying an edge collapse operation; or a
vertex removal operation, wherein a given operation to be applied to remove the one or more vertices or edges is selected based on the distortion analysis.

* * * * *